United States Patent
Zhang et al.

(10) Patent No.: US 12,387,043 B2
(45) Date of Patent: Aug. 12, 2025

(54) GENERATING AN IMPROVED NAMED ENTITY RECOGNITION MODEL USING NOISY DATA WITH A SELF-CLEANING DISCRIMINATOR MODEL

(71) Applicant: Adobe Inc., San Jose, CA (US)

(72) Inventors: Ruiyi Zhang, San Jose, CA (US); Zhendong Chu, Charlottesville, VA (US); Vlad Morariu, Potomac, MD (US); Tong Yu, San Jose, CA (US); Rajiv Jain, Falls Church, VA (US); Nedim Lipka, Santa Clara, CA (US); Jiuxiang Gu, College Park, MD (US)

(73) Assignee: Adobe Inc., San Jose, CA (US)

( * ) Notice: Subject to any disclaimer, the term of this patent is extended or adjusted under 35 U.S.C. 154(b) by 207 days.

(21) Appl. No.: 18/472,746

(22) Filed: Sep. 22, 2023

(65) Prior Publication Data

US 2025/0103813 A1     Mar. 27, 2025

(51) Int. Cl.
    *G06F 40/295*     (2020.01)
(52) U.S. Cl.
    CPC .................. *G06F 40/295* (2020.01)
(58) Field of Classification Search
    None
    See application file for complete search history.

(56) References Cited

U.S. PATENT DOCUMENTS

| | | | |
|---|---|---|---|
| 10,628,483 B1 * | 4/2020 | Rao | G06F 16/683 |
| 2022/0269939 A1 * | 8/2022 | Zhao | G06F 40/30 |
| 2023/0325599 A1 * | 10/2023 | Nezami | G06N 3/006 |

OTHER PUBLICATIONS

Alec Radford, Jeffrey Wu, Rewon Child, David Luan, Dario Amodei, Ilya Sutskever, et al. 2019. Language models are unsupervised multitask learners. OpenAI blog, 1(8):9.

Antti Tarvainen and Harri Valpola. 2017. Mean teachers are better role models: Weight-averaged consistency targets improve semi-supervised deep learning results. Advances in neural information processing systems, 30.

Bianca Zadrozny and Charles Elkan. 2001. Obtaining calibrated probability estimates from decision trees and naive bayesian classifiers. In Icml, vol. 1, pp. 609-616. Citeseer.

(Continued)

*Primary Examiner* — Antim G Shah
(74) *Attorney, Agent, or Firm* — Keller Preece PLLC

(57) ABSTRACT

This disclosure describes one or more implementations of systems, non-transitory computer-readable media, and methods that train a named entity recognition (NER) model with noisy training data through a self-cleaning discriminator model. For example, the disclosed systems utilize a self-cleaning guided denoising framework to improve NER learning on noisy training data via a guidance training set. In one or more implementations, the disclosed systems utilize, within the denoising framework, an auxiliary discriminator model to correct noise in the noisy training data while training an NER model through the noisy training data. For example, while training the NER model to predict labels from the noisy training data, the disclosed systems utilize a discriminator model to detect noisy NER labels and reweight the noisy NER labels provided for training in the NER model.

20 Claims, 9 Drawing Sheets

(56) References Cited

OTHER PUBLICATIONS

Bo Han, Quanming Yao, Xingrui Yu, Gang Niu, Miao Xu, Weihua Hu, Ivor Tsang, and Masashi Sugiyama. 2018. Co-teaching: Robust training of deep neural networks with extremely noisy labels. Advances in neural information processing systems, 31.
Chen Liang, Yue Yu, Haoming Jiang, Siawpeng Er, Ruijia Wang, Tuo Zhao, and Chao Zhang. 2020. Bond: Bert-assisted open-domain named entity recognition with distant supervision. In Proceedings of the 26th ACM SIGKDD International Conference on Knowledge Discovery & Data Mining, pp. 1054-1064.
Christopher Schröder, Andreas Niekler, and Martin Potthast. 2021. Revisiting uncertainty-based query strategies for active learning with transformers. arXiv preprint arXiv:2107.05687.
Dan Hendrycks, Mantas Mazeika, Duncan Wilson, and Kevin Gimpel. 2018. Using trusted data to train deep networks on labels corrupted by severe noise. Advances in neural information processing systems, 31.
Dominic Balasuriya, Nicky Ringland, Joel Nothman, Tara Murphy, and James R Curran. 2009. Named entity recognition in wikipedia. In Proceedings of the 2009 workshop on the people's web meets NLP: Collaboratively constructed semantic resources (People's Web), pp. 10-18. Aug. 7, 2009.
Dong-Ho Lee, Mahak Agarwal, Akshen Kadakia, Jay Pujara, and Xiang Ren. 2021. Good examples make a faster learner: Simple demonstration-based learning for low-resource ner. arXiv preprint arXiv:2110.08454.
Eric Arazo, Diego Ortego, Paul Albert, Noel E O'Connor, and Kevin McGuinness. 2020. Pseudo-labeling and confirmation bias in deep semi-supervised learning. In 2020 International Joint Conference on Neural Networks (IJCNN), pp. 1-8. IEEE. Aug. 8, 2019.
Erik F Sang and Fien De Meulder. 2003. Introduction to the conll-2003 shared task: Language-independent named entity recognition. arXiv preprint cs/0306050.
Filipe Rodrigues and Francisco Pereira. 2018. Deep learning from crowds. In Proceedings of the AAAI conference on artificial intelligence, vol. 32.
Filipe Rodrigues, Francisco Pereira, and Bernardete Ribeiro. 2014. Sequence labeling with multiple annotators. Machine learning, 95:165-181.
Guillaume Lample, Miguel Ballesteros, Sandeep Subramanian, Kazuya Kawakami, and Chris Dyer. 2016. Neural architectures for named entity recognition. arXiv preprint arXiv:1603.01360.
Haoming Jiang, Danqing Zhang, Tianyu Cao, Bing Yin, and Tuo Zhao. 2021. Named entity recognition with small strongly labeled and large weakly labeled data. arXiv preprint arXiv:2106.08977.
Hongxin Zhang, Yanzhe Zhang, Ruiyi Zhang, and Diyi Yang. 2022. Robustness of demonstration-based learning under limited data scenario. arXiv preprint arXiv:2210.10693.
Hyung Won Chung, Le Hou, Shayne Longpre, Barret Zoph, Yi Tay, William Fedus, Eric Li, Xuezhi Wang, Mostafa Dehghani, Siddhartha Brahma, et al. 2022. Scaling instruction-finetuned language models. arXiv preprint arXiv:2210.11416.
Jacob Devlin, Ming-Wei Chang, Kenton Lee, and Kristina Toutanova. 2018. Bert: Pre-training of deep bidirectional transformers for language understanding. arXiv preprint arXiv:1810.04805.
Jing Li, Aixin Sun, Jianglei Han, and Chenliang Li. 2020. A survey on deep learning for named entity recognition. IEEE Transactions on Knowledge and Data Engineering, 34(1):50-70.
John Lafferty, Andrew McCallum, and Fernando CN Pereira. 2001. Conditional random fields: Probabilistic models for segmenting and labeling sequence data.
Jun Shu, Qi Xie, Lixuan Yi, Qian Zhao, Sanping Zhou, Zongben Xu, and Deyu Meng. 2019. Meta-weight-net: Learning an explicit mapping for sample weighting. Advances in neural information processing systems, 32.
Kun Liu, Yao Fu, Chuanqi Tan, Mosha Chen, Ningyu Zhang, Songfang Huang, and Sheng Gao. 2021a. Noisy-labeled ner with confidence estimation. In Proceedings of the 2021 Conference of the North American Chapter of the Association for Computational Linguistics: Human Language Technologies, pp. 3437-3445.
Lance A Ramshaw and Mitchell P. Marcus. 1999. Text chunking using transformation-based learning. In Natural language processing using very large corpora, pp. 157-176. Springer.
Linzhi Wu, Pengjun Xie, Jie Zhou, Meishan Zhang, Chunping Ma, Guangwei Xu, and Min Zhang. 2022. Self-augmentation for named entity recognition with meta reweighting. arXiv preprint arXiv:2204.11406.
Michael A Hedderich, Dawei Zhu, and Dietrich Klakow. 2021. Analysing the noise model error for realistic noisy label data. In Proceedings of the AAAI Conference on Artificial Intelligence, vol. 35, pp. 7675-7684.
Nils Reimers and Iryna Gurevych. 2019. Sentence-bert: Sentence embeddings using siamese bert-networks. arXiv preprint arXiv:1908.10084.
Pengfei Liu, Weizhe Yuan, Jinlan Fu, Zhengbao Jiang, Hiroaki Hayashi, and Graham Neubig. 2021. Pre-train, prompt, and predict: A systematic survey of prompting methods in natural language processing. arXiv preprint arXiv:2107.13586.
Ralph Weischedel, Martha Palmer, Mitchell Marcus, Eduard Hovy, Sameer Pradhan, Lance Ramshaw, Nianwen Xue, Ann Taylor, Jeff Kaufman, Michelle Franchini, et al. 2013. Ontonotes release 5.0 ldc2013t19. Linguistic Data Consortium, Philadelphia, PA, 23.
Tianyu Gao, Adam Fisch, and Danqi Chen. 2021. Making pretrained language models better few-shot learners. In Proceedings of the 59th Annual Meeting of the Association for Computational Linguistics and the 11th International Joint Conference on Natural Language Processing (vol. 1: Long Papers), pp. 3816-3830.
Tim Finin, Will Murnane, Anand Karandikar, Nicholas Keller, Justin Martineau, Mark Dredze, et al. 2010. Annotating named entities in twitter data with crowd-sourcing. In Proceedings of the NAACL Workshop on Creating Speech and Language Data With Amazon's Mechanical Turk.
Tom Brown, Benjamin Mann, Nick Ryder, Melanie Subbiah, Jared D Kaplan, Prafulla Dhariwal, Arvind Neelakantan, Pranav Shyam, Girish Sastry, Amanda Askell, et al. 2020. Language models are few-shot learners. Advances in neural information processing systems, 33:1877-1901. May 28, 2020.
Yazhou Yao, Zeren Sun, Chuanyi Zhang, Fumin Shen, Qi Wu, Jian Zhang, and Zhenmin Tang. 2021. Jo-src: A contrastive approach for combating noisy labels. In Proceedings of the IEEE/CVF Conference on Computer Vision and Pattern Recognition, pp. 5192-5201.
Mnhan Liu, Myle Ott, Naman Goyal, Jingfei Du, Mandar Joshi, Danqi Chen, Omer Levy, Mike Lewis, Luke Zettlemoyer, and Veselin Stoyanov. 2019. Roberta: A robustly optimized bert pretraining ap-proach. arXiv preprint arXiv:1907.11692.
Yu Meng, Yunyi Zhang, Jiaxin Huang, Xuan Wang, Yu Zhang, Heng Ji, and Jiawei Han. 2021. Distantly-supervised named entity recognition with noise-robust learning and language model augmented self-training. In Proceedings of the 2021 Conference on Empirical Methods in Natural Language Processing, pp. 10367-10378.
Zhendong Chu and Hongning Wang. 2021. Improve learning from crowds via generative augmentation. In Proceedings of the 27th ACM SIGKDD Conference on Knowledge Discovery & Data Mining, pp. 167-175.
Zhendong Chu, Jing Ma, and Hongning Wang. 2021. Learning from crowds by modeling common confusions. In Proceedings of the AAAI Conference on Artificial Intelligence, vol. 35, pp. 5832-5840.

\* cited by examiner

GENERATING AN IMPROVED NAMED ENTITY RECOGNITION MODEL USING NOISY DATA WITH A SELF-CLEANING DISCRIMINATOR MODEL

BACKGROUND

Recent years have seen an increasing implementation of computer systems that implement learning models to perform language recognition tasks. For example, computing devices are able to recognize, from text, various described entities, classes, and other descriptors from the text. Oftentimes, conventional systems utilize named entity recognition (NER) models to recognize entities, classes, and other descriptors from text. Indeed, many NER models use deep learning to process human language (via text) to discover entities and other elements from the human language text (e.g., identifying or understanding persons, locations, or other objects described within the human language text). Although many conventional systems utilize NER models for human language processing, such systems have a number of shortcomings, particularly with regards to efficiently and flexibly training NER models to improve the accuracy of NER models.

SUMMARY

This disclosure describes one or more implementations of systems, non-transitory computer-readable media, and computer-implemented methods that solve one or more of the following problems by training an NER model with noisy training data through a self-cleaning discriminator model. In one or more embodiments, the disclosed systems utilize a self-cleaning guided denoising framework to improve NER learning on noisy training data via a guidance training set. In particular, in one or more implementations, the disclosed systems utilize, within the denoising framework, an auxiliary discriminator model to correct noise in the noisy training data while training an NER model through the noisy training data. For example, the disclosed systems, while training the NER model to predict labels from the noisy training data, utilize a discriminator model to detect noisy NER labels and reweight the noisy NER labels provided for training in the NER model.

BRIEF DESCRIPTION OF THE DRAWINGS

The detailed description is described with reference to the accompanying drawings in which.

DETAILED DESCRIPTION

Figure 1:
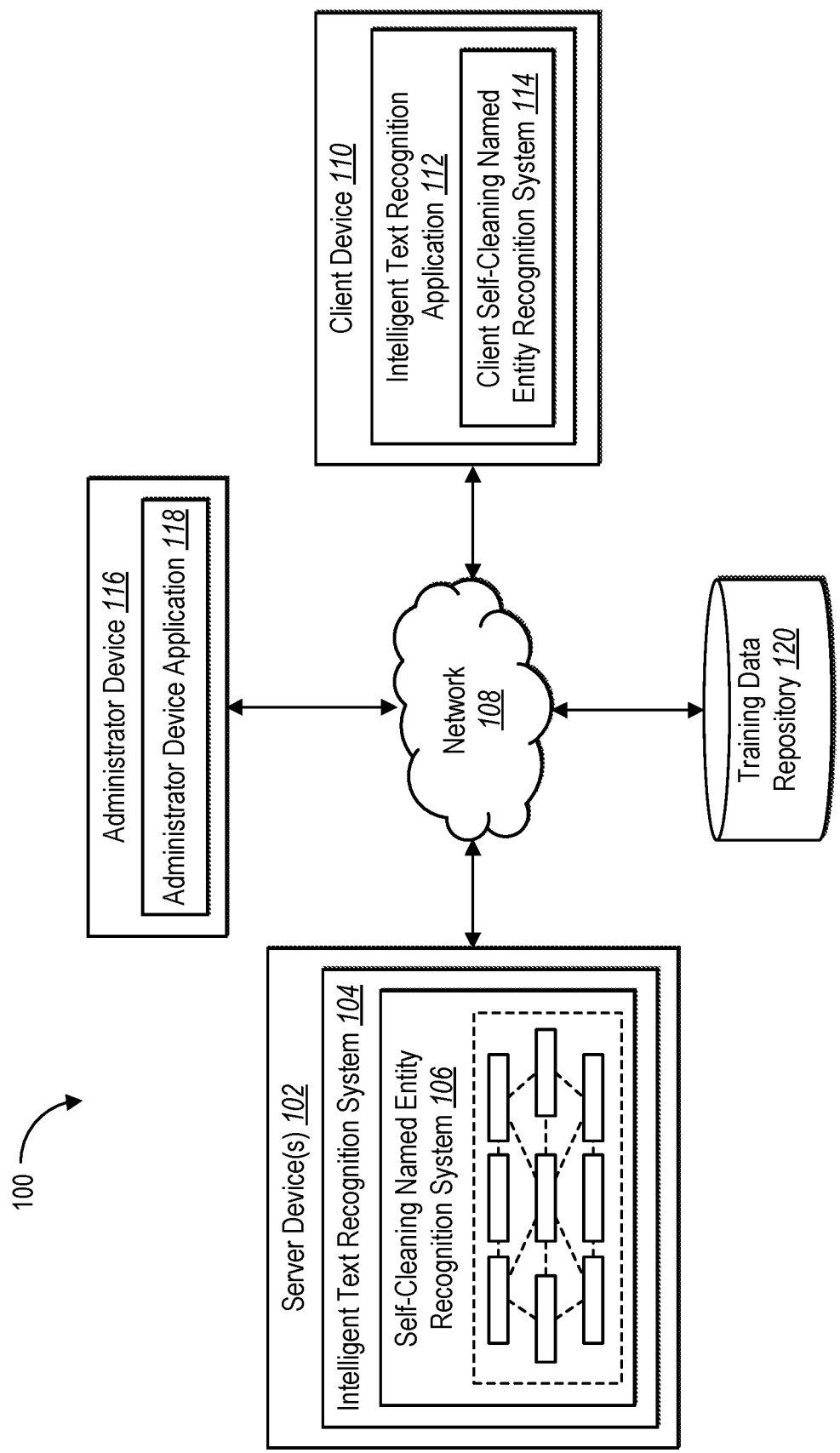
FIG. 1 illustrates a schematic diagram of an example environment in which a self-cleaning named entity recognition system operates in accordance with one or more implementations.

This disclosure describes one or more implementations of a self-cleaning named entity recognition system that utilizes a self-cleaning guided denoising framework through a discriminator model to improve NER learning on noisy training data. For instance, the self-cleaning named entity recognition system utilizes an NER model to predict labels (e.g., entity labels, class labels) from a training sentence obtained from noisy training data. In addition, the self-cleaning named entity recognition system provides the predicted labels (for the training sentence) to a discriminator model to generate discriminator weights for the predicted labels that indicate an authenticity (or correctness) of the predicted labels (e.g., to detect and down weight noisy labels). Indeed, in one or more instances, the self-cleaning named entity recognition system trains the discriminator model on a guidance set of training data that includes accurate (e.g., high quality) sentence and label pairings. Furthermore, in one or more implementations, the self-cleaning named entity recognition system utilizes the discriminator weights with the predicted labels to modify losses for the predicted labels. For instance, the self-cleaning named entity recognition system utilizes the weighted losses to adjust (or learn) parameters of the NER model.

In one or more embodiments, the self-cleaning named entity recognition system utilizes noisy training data to train (or learn parameters) of an NER model. In particular, in some embodiments, the self-cleaning named entity recognition system obtains a large amount of training data that includes sentences and label annotations for the sentences via crowdsourcing and/or through distant supervisions from knowledge bases. In many cases, the large amount of training data is noisy and includes incorrectly labeled entities and/or classes (or categories) for entities in the training sentences. Nonetheless, the self-cleaning named entity recognition system utilizes the noisy training data to accurately train an NER model.

In particular, in one or more embodiments, the named recognition system trains a discriminator model on a guidance set of training data that includes accurately labeled entities and/or classes (or categories) for entities in training sentences to determine an authenticity score indicating whether a predicted label (e.g., an entity and/or class label) is appropriate (or correct) given the context of a training sentence. Moreover, in one or more cases, the discriminator model determines weights (via authenticity scores) for predicted entity labels and predicted class labels (from the NER model). Furthermore, in one or more instances, the self-cleaning named entity recognition system utilizes the discriminator model to guide the NER model's training by reweighting training labels from the noisy training data while training the NER model with the noisy training data.

As an example, the self-cleaning named entity recognition system utilizes the NER model with the noisy training data to predict labels (e.g., an entity label and a class label for the entity) for training sentences. Then, in one or more instances, the self-cleaning named entity recognition system provides the predicted labels to the discriminator model to generate discriminator weights for the predicted labels (e.g., using authenticity score of the predicted labels). Moreover, in one or more implementations, the self-cleaning named entity recognition system utilizes the discriminator weights to reweight the predicted labels. For instance, the self-cleaning named entity recognition system modifies losses in the NER model corresponding to the predicted labels and/or weighting the predicted labels to affect a predicted label loss in the NER model. Indeed, in one or more cases, utilizing the reweighted predicted labels (e.g., to detect and de-emphasize noisy labels) enables the discriminator model to guide the training of the NER model for accuracy.

Additionally, in one or more embodiments, the self-cleaning named entity recognition system co-trains the discriminator model with the NER model. Indeed, in one or more implementations, the self-cleaning named entity recognition system utilizes high quality predictions from the NER model to augment the guidance training data set utilized by the discriminator model. In particular, the self-cleaning named entity recognition system determines an accuracy metric and an informative metric (e.g., indicating an uncertainty) for a predicted label from the NER model. Upon determining that the accuracy metric and/or the informative metric satisfies a threshold metric, the self-cleaning named entity recognition system can augment the guidance training data set by introducing the training sentence and predicted label(s) for the training sentence into the guidance training data set (e.g., the guidance training data set utilized for training the discriminator model and/or for clean demonstrations).

Moreover, in some implementations, the self-cleaning named entity recognition system utilizes demonstrations to train the NER model. In particular, in one or more embodiments, the self-cleaning named entity recognition system incorporates training data from the guidance training data set (e.g., the high quality training data set used to train the discriminator model) to simulate robust outputs from the NER model. For example, the self-cleaning named entity recognition system, for a training sentence from the noisy training data set, identifies a similar sentence from the guidance training data set as a demonstrative sentence. Moreover, in one or more instances, the self-cleaning named entity recognition system utilizes the labels (e.g., the entity labels and/or class labels) from the demonstrative sentence to form a clean demonstration for the training sentence.

As mentioned above, many conventional systems suffer from a number of technical deficiencies. For instance, conventional systems often inefficiently utilize noisy training data that results in inaccurate training of NER models. In particular, training an NER model is often time consuming and computationally expensive. Many conventional systems utilize a large amount of training data to improve the accuracy of the NER model. However, due to the large size of the training data, these conventional system often use noisy training data that results in inaccurate training of the NER model. Accordingly, many conventional systems expend a substantial, inefficient amount of time and computational resources to train an NER model with noisy training data that fails to yield improvements in the accuracy of the NER model.

To address such technical deficiencies of using noisy training data, many conventional systems utilize NER models in a rigid manner. For instance, many conventional systems attempt to obtain quality training data (e.g., expert annotated training data) to reduce noise during training of an NER model. Such quality training data is often difficult and time intensive to obtain. Accordingly, conventional systems are often unable to train NER models for a specific task because the training would require collection a large amount of expensive and/or time intensive quality training data that is specific for the task (e.g., medical terms, varying languages, sports, engineering jargon). Indeed, due to this rigidity in training, conventional systems are unable to adapt the training of NER models to specific tasks.

Additionally, some conventional systems attempt to resolve the technical deficiencies of using noisy training data by utilizing denoising techniques specifically for noisy NER training data. For example, many conventional systems utilize fine-tuning pre-trained language models (PLMs) on noisy training data to employ early stopping and self-training techniques to mitigate over-fitting induced by noisy training labels. Some conventional systems further utilize frozen PLMs to generate augmented pseudo labels for self-training an NER model. Moreover, some conventional systems eliminate self-training labels with low estimated label confidence (to denoise noisy training data). However, the above-mentioned denoising techniques utilized by these conventional systems often suffer from confirmation biases, fail to develop a self-correcting NER model, and often fail to identify particular types of noise (e.g., span errors).

The self-cleaning named entity recognition system provides a number of advantages relative to these conventional systems. For instance, in contrast to many conventional systems, the self-cleaning named entity recognition system efficiently utilizes (large) noisy training data sets to improve the accuracy of NER models. In one or more instances, the self-cleaning named entity recognition system utilizes a self-cleaning guided denoising framework through a discriminator model to improve NER learning on noisy training data. Indeed, in one or more instances, the self-cleaning named entity recognition system utilizes a discriminator model (with a set of guidance training data) to guide the NER model's training by reweighting training labels from noisy training data while training the NER model. This enables the self-cleaning named entity recognition system to efficiently utilize large, noisy training data sets for NER model training while improving the accuracy of the NER model. In many instances, one or more implementations of the self-cleaning named entity recognition system outperform various existing NER models when trained using noisy training data (as described in the experiments herein).

Additionally, unlike conventional systems that utilize NER models in a rigid manner due to constraints on obtaining quality training data, the self-cleaning named entity recognition system flexibly trains an NER model for a variety of specific tasks by using easily obtainable, albeit noisy training data for the specific tasks. For instance, since the self-cleaning named entity recognition system is capable of accurately training an NER model using noisy training data through guidance from a discriminator model, the self-cleaning named entity recognition system is capable of obtaining inexpensive and quick training data for a specific task (e.g., via crowdsourcing and/or distant supervision) even if the obtained training data includes noisy data samples. Accordingly, due to this flexibility in training via noisy data sets, the self-cleaning named entity recognition system is able to adapt the training of NER models to specific tasks via quickly and inexpensively obtained training data for the specific task.

Moreover, in contrast to conventional systems that utilize denoising techniques that result in confirmation biases by the trained NER models, the self-cleaning named entity recognition system improves the performance of NER models trained on noisy data by guiding the learning process via a guidance set and a discriminator model. By using guidance via the discriminator model, the self-cleaning named entity recognition system corrects noise in a noisy training data set to result in a trained NER model that is improved over various conventional NER models (and suffers less from confirmation biases). Additionally, in many cases, the self-cleaning named entity recognition system utilizes a discriminator model (trained on a guidance training data set) that is able to detect various noise and/or error types (e.g., span errors, category errors, semantic errors).

Turning now to the figures, FIG. 1 illustrates a schematic diagram of one or more implementations of a system 100 (or environment) in which a self-cleaning named entity recognition system operates in accordance with one or more implementations. As illustrated in FIG. 1, the system 100 includes a server device(s) 102, a network 108, a client device 110, an administrator device 116, and a training data repository 120. As further illustrated in FIG. 1, the server device(s) 102, the client device 110, the administrator device 116, and the training data repository 120 communicate via the network 108.

In one or more implementations, the server device(s) 102 includes, but is not limited to, a computing (or computer) device (as explained below with reference to FIG. 9). As shown in FIG. 1, the server device(s) 102 include an intelligent text recognition system 104 which further includes the self-cleaning named entity recognition system 106. The intelligent text recognition system 104 can generate, train, store, deploy, and/or utilize various machine learning models (e.g., NER models, generative pre-trained transformer models) for various text recognition applications, such as, but not limited to, named entity recognition tasks, natural language processing tasks, classification tasks, and/or voice recognition tasks. In addition, the intelligent text recognition system 104 can utilize various text recognition applications (using deep learning models) to analyze text (and/or voice data) to extract, generate, and/or categorize information from the text (and/or voice data).

Moreover, as explained below, the self-cleaning named entity recognition system 106, in one or more embodiments, utilizes a self-cleaning guided denoising framework through a discriminator model to improve NER learning on noisy training data. In some implementations, the self-cleaning named entity recognition system 106 utilizes, within the denoising framework, an auxiliary discriminator model to correct noise in the noisy training data while training an NER model through the noisy training data. For example, the self-cleaning named entity recognition system 106, while training the NER model to predict labels from the noisy training data, utilize a discriminator model to detect noisy NER labels and reweight the noisy NER labels provided for training in the NER model. Indeed, the self-cleaning named entity recognition system 106 trains and deploys an NER model in accordance with one or more implementations herein.

Furthermore, as shown in FIG. 1, the system 100 includes the client device 110. In one or more implementations, the client device 110 includes, but is not limited to, a mobile device (e.g., smartphone, tablet), a laptop, a desktop, or any other type of computing device, including those explained below with reference to FIG. 9. In certain implementations, although not shown in FIG. 1, the client device 110 is operated by a user to perform a variety of functions (e.g., via the intelligent text recognition application 112). For example, the client device 110 performs functions, such as, but not limited to, collecting and/or providing training data (e.g., noisy and/or guidance training data) for the NER model (e.g., via crowdsourced training data and/or user annotated training data). Furthermore, in some cases, the client device 110 also performs functions, such as, but not limited to, utilizing an NER model (trained in accordance with one or more implementations herein) to analyze text (and/or voice data) to extract, generate, and/or categorize information from the text (and/or voice data).

To access the functionalities of the self-cleaning named entity recognition system 106 (as described above), in one or more implementations, a user interacts with the intelligent text recognition application 112 on the client device 110. For example, the intelligent text recognition application 112 includes one or more software applications installed on the client device 110 (e.g., to obtain, provide, and/or utilize training data and/or NER models in accordance with one or more implementations herein). In some cases, the intelligent text recognition application 112 is hosted on the server device(s) 102. In addition, when hosted on the server device(s) 102, the intelligent text recognition application 112 is accessed by the client device 110 through a web browser and/or another online interfacing platform and/or tool.

Although FIG. 1 illustrates the self-cleaning named entity recognition system 106 being implemented by a particular component and/or device within the system 100 (e.g., the server device(s) 102), in some implementations, the self-cleaning named entity recognition system 106 is implemented, in whole or in part, by other computing devices and/or components in the system 100. For example, in some implementations, the self-cleaning named entity recognition system 106 is implemented on the client device 110 within the intelligent text recognition application 112 (e.g., via a client self-cleaning named entity recognition system 114). Indeed, in one or more implementations, the description of (and acts performed by) the self-cleaning named entity recognition system 106 are implemented (or performed by) the client self-cleaning named entity recognition system 114 when the client device 110 implements the self-cleaning named entity recognition system 106. More specifically, in some instances, the client device 110 (via an implementation of the self-cleaning named entity recognition system 106 on the client self-cleaning named entity recognition system 114) utilizes a self-cleaning guided denoising framework through a discriminator model to improve NER learning on noisy training data.

Moreover, as shown in FIG. 1, the system 100 includes the administrator device 116. In one or more implementations, the administrator device 116 includes, but is not limited to, a mobile device (e.g., smartphone, tablet), a laptop, a desktop, or any other type of computing device, including those explained below with reference to FIG. 9. In certain implementations, although not shown in FIG. 1, the administrator device 116 is operated by an administrator user to perform a variety of functions (e.g., via the administrator device application 118). For example, the administrator device 116 performs functions, such as, but not limited to, collecting, providing, and/or orchestrating the collection of training data (e.g., noisy and/or guidance training data) for the NER model, adjusting training parameters for the NER model, and/or adjusting parameters for the discriminator model.

To access the functionalities of the self-cleaning named entity recognition system 106 (as described above), in one or more implementations, an administrator user interacts with the administrator device application 118 on the client device 110. For example, administrator device application 118 includes one or more software applications installed on the administrator device 116. In some cases, the administrator device application 118 is hosted on the server device(s) 102. In addition, when hosted on the server device(s) 102, the administrator device application 118 is accessed by the client device 110 through a web browser and/or another online interfacing platform and/or tool.

Furthermore, as shown in FIG. 1, the system 100 includes the training data repository 120. Indeed, in one or more cases, the self-cleaning named entity recognition system 106 retrieves training data from the training data repository 120. In particular, in one or more instances, the training data repository 120 includes guidance training data sets utilized for training discriminator models, utilized for demonstration, and/or utilized to train NER models. In addition, in one or more embodiments, the training data repository 120 incudes noisy training data sets utilized for training NER models (e.g., training data obtained via crowdsourcing and/or distant supervision).

Although FIG. 1 illustrates the system 100 including singular devices (e.g., a single client device 110, a single administrator device 116, a single training data repository 120), the system 100, in one or more cases, includes various numbers of devices. For example, the system 100, in some cases, includes multiple client devices and/or administrator devices. Moreover, the system 100, in one or more instances, includes multiple training data repositories.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 9. Furthermore, although FIG. 1 illustrates the server device(s) 102 and the client device 110 communicating via the network 108, in certain implementations, the various components of the system 100 communicate and/or interact via other methods (e.g., the server device(s) 102 and the client device 110 communicating directly).

Figure 2:
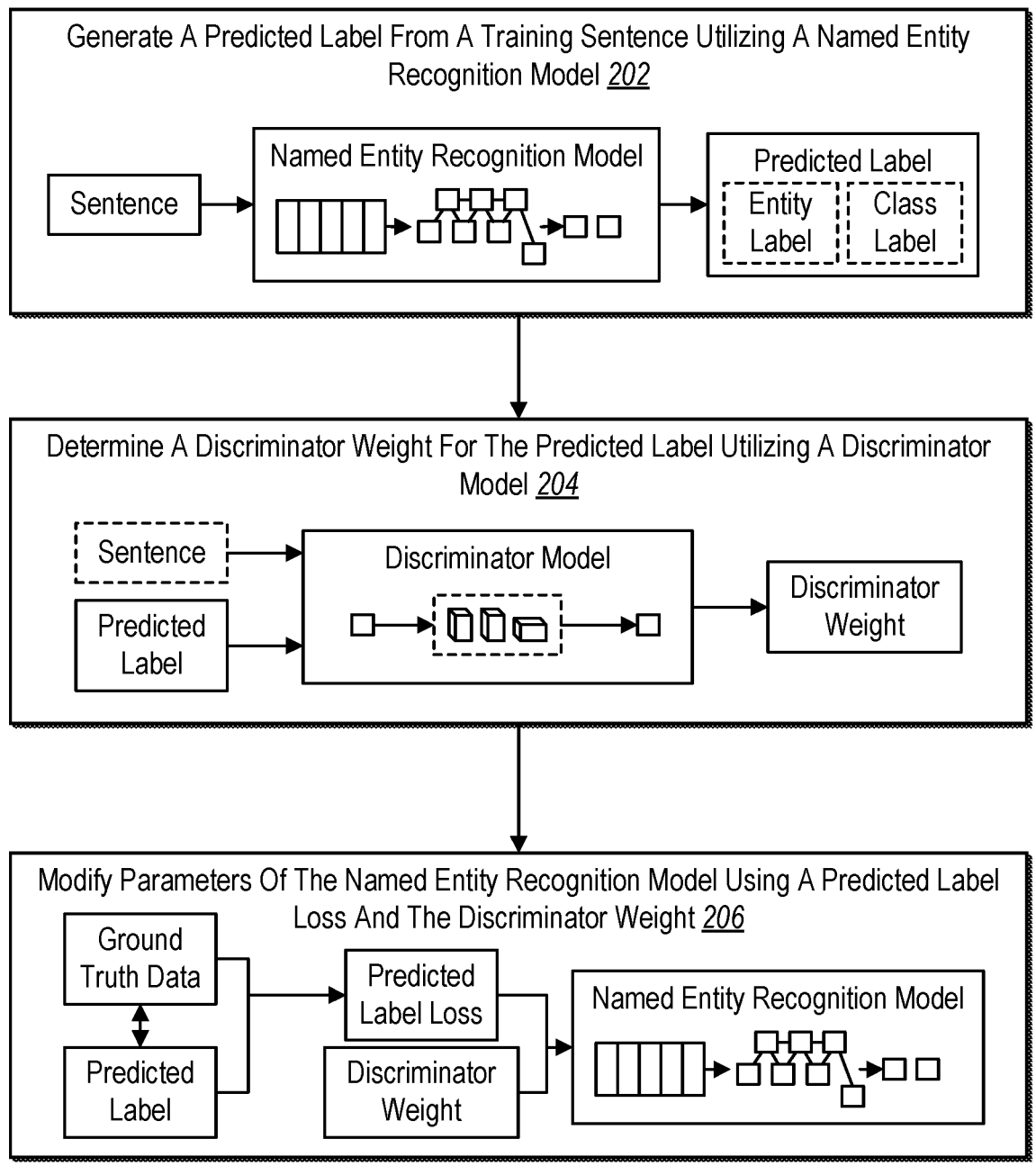
FIG. 2 illustrates an exemplary flow of a self-cleaning named entity recognition system training a named entity recognition model in accordance with one or more implementations.

As mentioned above, the self-cleaning named entity recognition system 106 utilizes a self-cleaning guided denoising framework through a discriminator model to improve NER learning on noisy training data. For instance, FIG. 2 illustrates an overview of the self-cleaning named entity recognition system 106 training an NER model with noisy training data through a discriminator model that guides the NER model's training by reweighting training labels from the noisy training data. For example, FIG. 2 illustrates the self-cleaning named entity recognition system 106 generating a predicted label from a training sentence utilizing a named entity recognition model, determining a discriminator weight for the predicted label utilizing a discriminator model, and modifying parameters of the named entity recognition model using a predicted label loss and the discriminator weight.

As shown in an act 202 of FIG. 2, the self-cleaning named entity recognition system 106 generates a predicted label from a training sentence utilizing a named entity recognition model. In one or more embodiments, the self-cleaning named entity recognition system 106 utilizes a training sentence from a noisy training data set to generate predicted labels for the training sentence. As shown in FIG. 2, in some instances, the self-cleaning named entity recognition system 106 generates an entity label (e.g., indicating an entity within the training sentence) and a class label for the entity label (e.g., indicating a class or category type for the entity). Indeed, the self-cleaning named entity recognition system 106 generates predicted labels from sentences using an NER model as described below (e.g., in reference to FIGS. 3, 4, and 6).

In one or more embodiments, an NER model includes a machine learning model that identifies named entities in text (and/or a voice-based prompt) and/or classifies one or more named entities into entity classes (or categories). For example, an NER model includes a natural language processing (NLP) machine learning model that extracts and identifies information from text (e.g., one or more sentences and/or voice-based prompts). As an example, an NER model extracts, from one or more sentences, one or more words identified to be an entity and/or a classification for the entity into a class (or category). To illustrate, in a sentence "Kyoto is beautiful in the spring," an NER model extracts "Kyoto" and "spring" as entities and determines a class label of "Place" or "Location" for "Kyoto" and "time" or "season" for "spring." For example, in one or more embodiments, the self-cleaning named entity recognition system 106 utilizes an NER model as described in Jing Li et al., A Survey on Deep Learning for Named Entity Recognition, IEEE Transactions on Knowledge and Data Engineering, available at https://arxiv.org/pdf/1812.09449.pdf, (2020), the entire contents of which is hereby incorporated by reference.

Furthermore, in one or more instances, a machine learning (or deep learning) model includes a computer algorithm or a collection of computer algorithms that automatically improve for a particular task through experience based on use of data. For example, a machine learning (or deep learning) model utilizes one or more learning techniques (e.g., backpropagation) to improve in accuracy and/or effectiveness. Example machine learning (or deep learning) models include various types of supervised and/or unsupervised natural language processing models. For example, a machine learning (or deep learning) model includes, but is not limited to, neural networks, large language models, and/or bidirectional encoder representation from transformers models, a long short-term memory model, a convolutional neural network (CNN) model, and/or a recurrent neural network (RNN) model.

In addition, a predicted label includes information extracted from text (or audio data) by an NER model. In particular, in one or more embodiments, a predicted label includes information identifying entities, objects, and/or other attributes described in a text (or audio data). For instance, a predicted label includes, but is not limited to, a predicted entity label and/or a predicted class (or category) label.

In one or more embodiments, an entity label (or predicted entity label) includes information indicating that one or more words describes an entity, such as, but not limited to, a name, a location, an organization, a time, an object (e.g., cars, currency), and/or another noun term. In addition, in one or more instances, a class label (or predicted class label) includes information indicating a category or type of entity described by one or more entity words. For example, a class label indicates a type of entity, such as, but not limited, a location entity, a time entity, a type of car entity, a person entity, and/or a type of food entity. To illustrate, in one or more embodiments, the self-cleaning named entity recognition system 106 determines that the word "Salt Lake City" is an entity (e.g., via assigning an entity label) and also determines that the "Salt Lake City" entity is a location entity (e.g., via a class label of location).

Furthermore, in one or more embodiments, a training data set includes a set of training sentences with corresponding ground truth labels (e.g., ground truth entity and/or ground truth class labels). In particular, in one or more instances, the training data set includes sentences with annotated entities and class (or category) labels for the entities. In some instances, the training data set includes ground truth prompts for a sentence indicating one or more entities and entity classes in the sentence. For example, for a training sentence "the train is from Chicago to Miami," the training data set includes ground truth entity labels for "train," "Chicago," and "Miami" with class labels vehicle, location, and location, respectively. Furthermore, in the above-mentioned sentence of "the train is from Chicago to Miami," the training data set includes ground truth prompts, such as "Chicago is an entity," "Chicago is a location entity," "train is an entity," and/or "train is a vehicle entity."

Additionally, in one or more embodiments, a noisy training data set includes a training data set (of sentences and ground truth entity and/or class labels) having one or more wrongly recognized entity labels and/or class labels for sentences. In some cases, a noisy training data set includes training data collected via crowd sourcing and/or distant supervisions from knowledge bases with one or more incorrectly labeled entity and/or class labels (e.g., a noticeable error rate).

Furthermore, in one or more implementations, a guidance (or clean) training data set includes a clean and/or quality training data set (of sentences and ground truth entity and/or class labels) having a substantial number of correctly labeled entity and/or class labels. In some cases, the guidance training data set includes training data collected via expert annotation. Indeed, in many embodiments, the noisy training data set includes training sentence and ground truth pairings with a higher (or greater) error rate than training sentence and ground truth pairings in the guidance training data set. Additionally, in some cases, the guidance training data set includes less training data than the noisy training data set. For example, an error rate includes a metric that indicates a proportion of incorrect ground truth labels for a training sample within a training set (e.g., an error rate of 25% when 1 out of 4 training samples include incorrectly labeled ground truth data).

Furthermore, as shown in an act 204 of FIG. 2, the self-cleaning named entity recognition system 106 determines a discriminator weight for the predicted label utilizing a discriminator model. For example, as shown in FIG. 2, the self-cleaning named entity recognition system 106 provides a predicted label (and sentence), from the NER model, to a discriminator model. Moreover, in one or more embodiments, the self-cleaning named entity recognition system 106 utilizes the discriminator model to determine whether a predicted label (e.g., an entity and/or class label) is appropriate (or correct) given the context of a training sentence (via an authenticity score) and utilize the determination to generate a discriminator weight for the predicted label. Indeed, the self-cleaning named entity recognition system 106 determines discriminator weights for predicted labels (of an NER model) using a discriminator model as described below (e.g., in reference to FIGS. 3-5).

In one or more instances, a discriminator model includes a machine learning model (e.g., a neural network) that classifies output of another machine learning model (e.g., the named entity recognition model) as authentic or not authentic (e.g., real or fake and/or correct or incorrect). For example, a discriminator model includes a machine learning model trained (using ground truth authenticity labels) to classify data as correct (e.g., authentic and/or correct entity and/or entity class determinations in context to a sentence) or incorrect (e.g., inauthentic and/or incorrect entity and/or entity class determinations in context to a sentence). For example, a discriminator model includes a machine learning model, such as, but not limited to bidirectional encoder representation from transformers models, generative language models (e.g., pre-trained language models), and/or one or more machine learning models described above. Furthermore, in one or more cases, the self-cleaning named entity recognition system 106 utilizes separate encoders for an NER model and a discriminator model. In addition, in one or more cases, the self-cleaning named entity recognition system 106 utilizes a masked language modeling (MLM) head for the discriminator model.

In one or more implementations, a discriminator model includes a machine learning model trained, using a guidance training data set having sentences with one or more labeled entities and/or entity classes to distinguish between authentic (i.e., correct) and/or not authentic (i.e., incorrect) entity determinations and/or entity class determinations for one or more sentences. Indeed, in one or more instances, the discriminator model classifies outputs of a named entity recognition model (as described herein) as correct and/or incorrect. As an example, for a determination that "Washington DC is a person entity" in the sentence "We are visiting Washington DC tomorrow," generates an incorrect (or not authentic) class entity label.

In some implementations, the self-cleaning named entity recognition system 106 utilizes a discriminator model to determine an authenticity score for an entity label and/or entity class label (output by a named entity recognition model). In particular, in one or more embodiments, the self-cleaning named entity recognition system 106 utilizes a confidence score of the discriminator model as an authenticity score (e.g., a 0.2 confidence, a 0.8 confidence in classifying an entity and/or an entity class as correct and/or incorrect). In some implementations, the self-cleaning named entity recognition system 106 utilizes a probability associated with an entity label and/or an entity class label as being a correct label for a sentence as the authenticity score.

Furthermore, in one or more implementations, the self-cleaning named entity recognition system 106 determines a discriminator weight from the discriminator model. In some cases, the self-cleaning named entity recognition system 106 utilizes the authenticity score (or confidence score) as a discriminator weight (e.g., a discriminator weight of 0.2, 0.8, 0.5). In one or more embodiments, the self-cleaning named entity recognition system 106 utilizes a discriminator weight to modify losses of a named entity recognition model and/or to reweight training samples from a training data set (e.g., a noisy training data set) utilized by the named entity recognition model.

In one or more instances, the self-cleaning named entity recognition system 106 utilizes a classification by the discriminator model to assign a discriminator weight. For example, the self-cleaning named entity recognition system 106 utilizes a "correct" or "authentic" classification by the discriminator model to assign (or apply) a positive weight (e.g., upweight) to a training sentence and/or label corresponding to the predicted entity label and/or predicted entity class label from the named entity recognition model (or noisy training data set). In some instances, the self-cleaning named entity recognition system 106 utilizes an "incorrect" or "not authentic" classification by the discriminator model to assign (or apply) a negative weight (e.g., down weight) to a training sentence and/or label corresponding to the predicted entity label and/or predicted entity class label from the named entity recognition model (or noisy training data set). In some instances, the self-cleaning named entity recognition system 106 up weights and/or down weights using a preselected weighting amount (e.g., 1.5 times and/or 0.5 times, 2 times and/or 0.75 times).

In addition, as shown in an act 206 of FIG. 2, the self-cleaning named entity recognition system 106 modifies parameters of the named entity recognition model using a predicted label loss and the discriminator weight. In particular, in one or more embodiments, the self-cleaning named entity recognition system 106 utilizes ground truth labels for the training sentence with the predicted label to generate a predicted label loss for the NER model. In addition, in one or more implementations, the self-cleaning named entity recognition system 106 utilizes the predicted label loss and the discriminator weight to train the NER model. For instance, in some cases, the self-cleaning named entity recognition system 106 reweights the predicted label loss using the discriminator weight and, then, utilizes the weighted loss to modify parameters of the NER model. In one or more implementations, the self-cleaning named entity recognition system 106 utilizes the discriminator weight to reweight the training label (and training sentence) such that training sample is deemphasized (e.g., down weighted) when determined to be noisy training sample and/or emphasized (e.g., up weighted) when determined to be a quality training sample (e.g., for subsequent training iterations of the NER model). Indeed, the self-cleaning named entity recognition system 106 modifies parameters of the NER model based on the discriminator weight as described below (e.g., in reference to FIG. 3).

Figure 3:
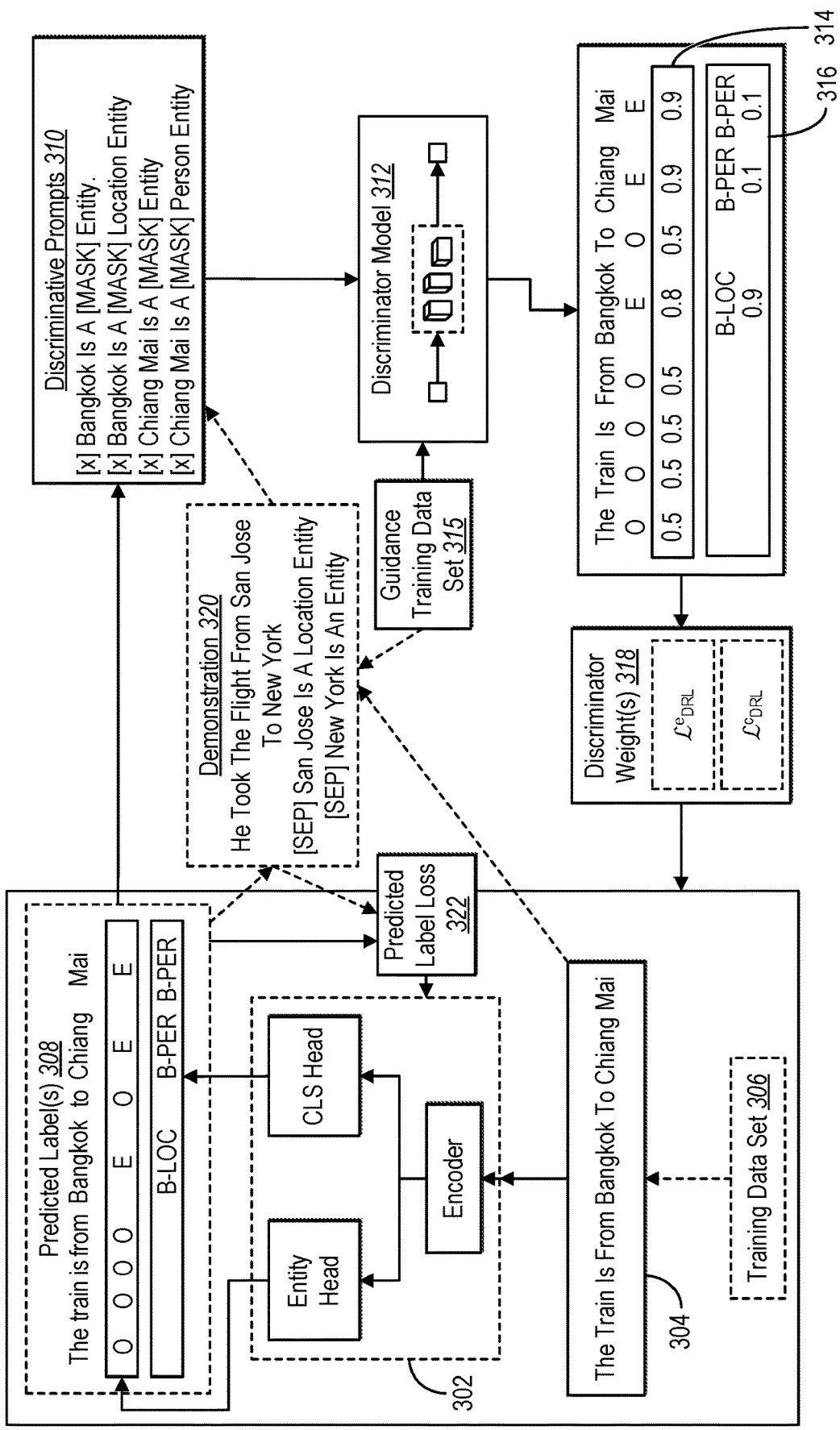
FIG. 3 illustrates a self-cleaning named entity recognition system utilizing a self-cleaning guided denoising framework through a discriminator model to improve NER learning on noisy training data in accordance with one or more implementations.

As mentioned above, the self-cleaning named entity recognition system 106 trains an NER model with noisy training data by utilizing a noisy training data cleaning discriminator model. For instance, FIG. 3 illustrates the self-cleaning named entity recognition system 106 utilizing a self-cleaning guided denoising framework through a discriminator model to improve NER learning on noisy training data. Indeed, FIG. 3 illustrates the self-cleaning named entity recognition system 106 utilizing discriminator weights determined for outputs of the NER model to guide the training the NER model.

As shown in FIG. 3, the self-cleaning named entity recognition system 106 identifies a training sentence 304 (e.g., "the train is from Bangkok to Chiang Mai") from a training data set 306 (e.g., a noisy training data set). Moreover, as shown in FIG. 3, the self-cleaning named entity recognition system 106 utilizes the training sentence 304 with an NER model 302 to generate predicted label(s) 308. In particular, as shown in FIG. 3, the self-cleaning named entity recognition system 106 utilizes an encoder and an entity head within the NER model 302 to generate predicted entity labels for words of the training sentence 304 (as the predicted label(s)). Indeed, as shown in FIG. 3, the self-cleaning named entity recognition system 106 utilizes the NER model 302 to determine an entity label for the words "Bangkok" and "Chiang Mai" (e.g., via a label or tag "E").

In addition, as shown in FIG. 3, the self-cleaning named entity recognition system 106 also utilizes the encoder and a CLS head in the NER model 302 to generate entity class labels for words indicated as entities in the training sentence 304 (as the predicted label(s)). For instance, as shown in FIG. 3, the self-cleaning named entity recognition system 106 utilizes the NER model 302 to determine a class label of "B-LOC" (e.g., a tag indicating location) for the identified entity term "Bangkok" in the training sentence 304. Moreover, as shown in FIG. 3, the self-cleaning named entity recognition system 106 utilizes the NER model 302 to determine a class label of "B-PER" (e.g., a tag indicating a person) for the identified entity term "Chiang Mai" in the training sentence 304.

As further shown in FIG. 3, the self-cleaning named entity recognition system 106 generates discriminative prompts 310 from the predicted label(s) 308 to utilize the predicted label(s) 308 with the discriminator model 312. In particular, as shown in FIG. 3, the self-cleaning named entity recognition system 106 generates discriminative prompts 310 for a sentence [x] (e.g., a placeholder for the training sentence 304) by utilizing a word (e.g., "Bangkok" and "Chiang Mai") determined to be an entity from the training sentence 304 as part of a template prompt that checks whether the word is an entity and a particular class of entity using a replaceable token. In particular, as shown in FIG. 3, the self-cleaning named entity recognition system 106 generates the discriminative prompts 310 to have a discriminator model 312 replace a [MASK] token in the discriminative prompts 310 with "correct" and/or "wrong."

Additionally, as shown in FIG. 3, the self-cleaning named entity recognition system 106 inputs the discriminative prompts 310 (with the replaceable token [MASK]) into the discriminator model 312 (e.g., a discriminator model trained using a guidance training data set 315). As further shown in FIG. 3, the discriminator model 312 determines entity label authenticity scores 314 for the entity labels (via the discriminative prompts 310). Indeed, as illustrated in FIG. 3, the discriminator model 312 determines an authenticity score indicating the confidence score (and/or probability) of replacing the replaceable token [MASK] with a "correct" indicator (e.g., a 0.8 confidence score out of 1.0 for "Bangkok is a [Correct] entity" and a 0.9 confidence score for "Chiang Mai is a [Correct] entity").

As also shown in FIG. 3, the discriminator model 312 determines entity class label authenticity scores 316 for the class labels (via the discriminative prompts 310). As shown in FIG. 3, the discriminator model 312 determines an authenticity score indicating the confidence score (and/or probability) of replacing the replaceable token [MASK] with a "correct" indicator for the class labels (e.g., a 0.9 confidence score for "Bangkok is a [Correct] location entity" and a 0.1 confidence score for "Chiang Mai is a [Correct] person entity"). Indeed, as illustrated in FIG. 3, the discriminator model 312 generates a class label authenticity score of 0.1 for the discriminative prompt "Chiang Mai is a [Correct] person entity" indicating that the class label is incorrect (in the context of the training sentence 304).

As further shown in FIG. 3, upon determining the authenticity scores (e.g., the entity label authenticity scores 314 and the entity class label authenticity scores 316), the self-cleaning named entity recognition system 106, via the discriminator model 312, determines discriminator weight(s) 318. In some embodiments, as illustrated in FIG. 3, the self-cleaning named entity recognition system 106, via the discriminator model 312, determines an entity label discriminator weight $\mathcal{L}_{DRL}^{e}$ (e.g., an entity label (e) discriminative reweight loss (DRL)) from the classifications of the discriminator model 312 for the entity labels (e.g., in the entity label authenticity scores 314). Moreover, in some implementations, as shown in FIG. 3, the self-cleaning named entity recognition system 106, via the discriminator model 312, determines a class label discriminator weight $\mathcal{L}_{DRL}{}^c$ (e.g., a class label (c) discriminative reweight loss (DRL)) from the classifications of the discriminator model 312 for the class labels (e.g., in the entity class label authenticity scores 316).

Furthermore, as shown in FIG. 3, the self-cleaning named entity recognition system 106 introduces the discriminator weight(s) 318 into training of the NER model 302. For instance, in some cases, the self-cleaning named entity recognition system 106 utilizes the discriminator weight(s) 318 (e.g., the entity label discriminator weight $\mathcal{L}_{DRL}{}^e$ and the class label discriminator weight $\mathcal{L}_{DRL}{}^e$) to reweight the training (or ground truth) labels corresponding to the training sentence 304. For instance, the self-cleaning named entity recognition system 106 reweights the training sentence 304 (and the ground truth labels) to emphasize and/or deemphasize the particular ground truth labels for the training sentence 304 according to the discriminator weight(s) 318. In some cases, the self-cleaning named entity recognition system 106 utilizes the discriminator weight(s) 318 to remove the training sentence 304 (and ground truth labels) from the training data set 306 as a noisy training sample.

In some instances, the self-cleaning named entity recognition system 106 utilizes the discriminator weight(s) 318 to modify (or weight) a predicted label loss (e.g., a predicted label loss 322) resulting from a particular ground truth label corresponding to the training sentence 304. For example, in some cases, the self-cleaning named entity recognition system 106 reweights the predicted label loss 322 using the discriminator weight(s) 318. Indeed, in some implementations, the self-cleaning named entity recognition system 106 modifies a loss between a predicted entity label and a ground truth entity label using the entity label discriminator weight $\mathcal{L}_{DRL}{}^e$. Moreover, in one or more implementations, the self-cleaning named entity recognition system 106 modifies a loss between a predicted class label and a ground truth class label using the class label discriminator weight $\mathcal{L}_{DRL}{}^c$.

As further shown in FIG. 3, the self-cleaning named entity recognition system 106 utilizes a predicted label loss 322 to train the NER model 302. In particular, in one or more embodiments, the self-cleaning named entity recognition system 106 determines the predicted label loss 322 for the NER model 302 by comparing the predicted label(s) 308 to ground truth labels corresponding to the training sentence 304 from the training data set 306. For example, the self-cleaning named entity recognition system 106 compares a predicted entity label to a ground truth entity label for the training sentence 304. Additionally, in some cases, the self-cleaning named entity recognition system 106 compares a predicted class label to a ground truth class label for the training sentence 304. Then, the self-cleaning named entity recognition system 106 utilizes the predicted label loss 322 to modify parameters of the NER model 302 (e.g., via backpropagation to minimize the predicted label loss in subsequent iterations of the NER model).

Indeed, in one or more embodiments, the self-cleaning named entity recognition system 106 utilizes the discriminator weight(s) 318 to train the NER model 302 (e.g., adjust parameters of the NER model based on training data outputs). For instance, in some cases, the self-cleaning named entity recognition system 106 directly utilizes the discriminator weights to modify a predicted label loss. Subsequently, in one or more implementations, the self-cleaning named entity recognition system 106 utilizes the modified predicted label loss to modify parameters of the NER model. Indeed, in one or more embodiments, the self-cleaning named entity recognition system 106 iteratively causes the NER model with modified parameters to predict labels, using the predicted labels with the discriminator model to receive additional discriminator weights, and trains (e.g., via backpropagation) the modified NER model based on an updated predicted label loss and the additional discriminator weights.

In some instances, the self-cleaning named entity recognition system 106 utilizes the discriminator weight(s) 318 to reweight the training sample directly (e.g., reweight the training sentence 304). For example, the self-cleaning named entity recognition system 106 reweights a training sample and utilizes the reweighted training sample with a modified parameter NER model (e.g., modified using predicted label losses). Moreover, in one or more cases, the self-cleaning named entity recognition system 106 generates an updated predicted label loss based on the updated outputs (and a comparison with ground truth labels) and the reweighted training sample. Then, the modified parameter NER model is further modified (or adjusted) using the updated predicted label loss (e.g., via backpropagation).

As an illustration (in reference to FIG. 3), the following functions describe the self-cleaning named entity recognition system 106 utilizing a self-cleaning guided denoising framework through a discriminator model to improve NER learning on noisy training data. For instance, the following functions (1)-(5) describe the self-cleaning named entity recognition system 106 utilizing and training an NER model. Moreover, the following functions (6)-(8) describe an example of the self-cleaning named entity recognition system 106 utilizing a discriminator model to evaluate the accuracy of assigned labels to guide an NER model's training (e.g., the self-cleaning guided denoising framework).

In one or more embodiments, the self-cleaning named entity recognition system 106 utilizes an NER model that identifies named entities in plain text (or audio) and classifies the entities into pre-defined entity classes (or categories), such as, but not limited to persons, organizations, and/or locations. To illustrate, in one or more implementations, the self-cleaning named entity recognition system 106 represents a sentence having n tokens as $x=[x_1, \ldots, x_n]$ and corresponding class labels as $y=[y_1, \ldots, y_n]$. Furthermore, in one or more implementations, the self-cleaning named entity recognition system 106 determines a labeled set D in accordance with the following function:

$$D = \{(x_i, y_i)\}_{i=1}^{|D|} \quad (1)$$

Furthermore, in one or more embodiments, the self-cleaning named entity recognition system 106 labels one or more entities and/or classes in a sentence using a schema. For instance, in some cases, the self-cleaning named entity recognition system 106 utilizes a BIO schema as described in Lance A. Ramshaw et. al., Text Chunking Using Transformation-Based Learning, available at https://arxiv.org/pdf/cmp-1g/9505040.pdf (1995), the content of which is hereby incorporated by reference in its entirety. In particular, in one or more implementations (and as shown in FIG. 3), the self-cleaning named entity recognition system 106 labels a first token of entity with a class type X as B-X, labels consecutive tokens of the entity as I-X (when a consecutive token exists for the same entity), and labels non-entity tokens as "0." In one or more instances, the self-cleaning named entity recognition system 106 utilizes various labeling schemas to label one or more entities and/or classes (e.g., individual tags for entities and classes, metadata with indexed tokens).

Moreover, in one or more implementations, the self-cleaning named entity recognition system 106 represents an NER model in accordance with the following function:

$$\hat{y} = f(x; \theta) \quad (2)$$

In the above-mentioned function (2), the self-cleaning named entity recognition system 106 utilizes a sentence x as input and outputs a predicted label sequence $\hat{y}$ in which $\theta$ is a parameter set (e.g., for the NER model). Additionally, in one or more embodiments, the self-cleaning named entity recognition system 106 trains the NER model by minimizing a loss $\mathcal{L}$ (e.g., a predicted label loss) as described in the following function:

$$\mathcal{L} = \frac{1}{|D|} \sum_{i=1}^{|D|} \ell(y_i, f(x_i; \theta)) \quad (3)$$

In the above-mentioned function (3), in one or more embodiments, the self-cleaning named entity recognition system 106 utilizes a variety of loss functions $\ell(\cdot,\cdot)$, such as, but not limited to cross-entropy loss for token-wise classification models, negative likelihood for conditional random field models, and/or mean squared error loss.

In some implementations, the self-cleaning named entity recognition system 106 utilizes a bidirectional encoder representation from transformers based-model with prediction heads as an NER model. In particular (as shown in FIG. 3), the self-cleaning named entity recognition system 106 utilizes an NER model with an entity head $f^e$ to predict whether a given token (e.g., word) belongs to an entity and a classification head $f^c$ to predict the class of a given token. Moreover, in one or more embodiments, the self-cleaning named entity recognition system 106 utilizes a bidirectional encoder representation from transformers based-model encoder for contextualized representations to input into the entity head $f^e$ and the classification head $f^c$. Indeed, in some cases, the self-cleaning named entity recognition system 106 utilizes a ROBERTa model for the NER model as described in Yinhan Liu, et. al., ROBERTa: A Robustly Optimized BERT Pretraining Approach, available at https://arxiv.org/pdf/1907.11692.pdf (2019) (hereinafter Yinhan Liu), the content of which is hereby incorporated by reference in its entirety.

Additionally, in one or more implementations, the self-cleaning named entity recognition system 106 decomposes the original label sequence y into a sequence of binary span labels e (e.g., entity labels) and a sequence of category labels c (e.g., class labels). Moreover, in some instances, the self-cleaning named entity recognition system 106 obtains the span (entity) labels by transforming B-X and I-X labels (from the above described BIO schema labels) into positive (entity) labels (denoted as E in FIG. 3) and negative (non-entity) labels (denoted as 0 labels in FIG. 3). Furthermore, as shown in FIG. 3, the self-cleaning named entity recognition system 106 assigns class (or category) labels to non-empty tokens (e.g., tokens marked as entities). In one or more instances, the self-cleaning named entity recognition system 106 trains the entity head $f^e$ on e with an entity label loss (e.g., a binary cross-entropy loss for entity labels). Moreover, in one or more embodiments, the self-cleaning named entity recognition system 106 trains the classification head $f^c$ on c with a class label loss (e.g., a binary cross-entropy loss for class labels). In some cases, the self-cleaning named entity recognition system 106 trains for both the entity label loss and the class label loss to handle span and category errors simultaneously.

Furthermore, in reference to FIG. 3, the self-cleaning named entity recognition system 106 utilizes the NER model to identify entities utilizing outputs from the entity head. Subsequently, in one or more embodiments, the self-cleaning named entity recognition system 106 utilizes the classification head $f^c$ to classify the outputs of the entity head $f^e$. Indeed, in one or more embodiments, the self-cleaning named entity recognition system 106 determines a predicted label sequence $\hat{y}$ (e.g., a predicted label) in accordance with the following function:

$$\hat{y} = \begin{cases} O, & f^e(x) \le t \\ \mathrm{argmax} f^c(x), & f^e(x) > t \end{cases} \quad (4)$$

In one or more instances, in the above-mentioned function (4), the self-cleaning named entity recognition system 106 utilizes t as a threshold for entity identification (e.g., a threshold of 0.5, 0.6, 0.7). Indeed, in some cases, the self-cleaning named entity recognition system 106 utilizes the threshold for entity identification to determine whether a token is an entity (by an entity identification prediction confidence score satisfying the threshold).

In some implementations, the self-cleaning named entity recognition system 106 utilizes a self-training NER model. In particular, in one or more embodiments, the self-cleaning named entity recognition system 106 utilizes predicted label sequences, from a first NER model training iteration, as pseudo labels for subsequent NER model training iterations. For instance, the self-cleaning named entity recognition system 106 utilizes a self-training NER model by minimizing a loss $\mathcal{L}_{Self}$ (e.g., a predicted label loss) from a predicted label sequence $\hat{y}_i$ as described in the following function:

$$\mathcal{L}_{Self} = \frac{1}{|D|} \sum_{i=1}^{|D|} \ell(\hat{y}_i, f(x_i; \theta)) \quad (5)$$

As mentioned above, in one or more instances, the self-cleaning named entity recognition system 106 utilizes a discriminator model to evaluate the accuracy of assigned labels to guide an NER model's training. Indeed, the self-cleaning named entity recognition system 106 utilizes the discriminator model to down weight labels with lower accuracy to mitigate those labels influence during NER model training (while retaining accurate labels). In one or more instances, the self-cleaning named entity recognition system 106 utilizes a unified discriminator that handles multiple types of error (e.g., span errors for entity labels and category errors for class labels).

Indeed, the self-cleaning named entity recognition system 106 utilizes the discriminator model with masked language prompts generated from NER predicted labels (as described above). To illustrate, in one or more embodiments, the self-cleaning named entity recognition system 106 generate discriminative prompts for span errors and/or discriminative prompts for category errors in accordance with the following discriminative prompt templates:

Span: [X].[Y] is a [MASK] entity.

Category: [X].[Y] is a [MASK] [Z] entity. (6)

In the above mentioned discriminative prompt templates (6), the self-cleaning named entity recognition system 106 utilizes [X] as a placeholder for a sentence x, [Y] as a placeholder for a predicted entity (label) e, and [Z] as a placeholder for a predicted class (label) c. In some cases, the self-cleaning named entity recognition system 106 generates prompts for span errors and/or category errors, such as, but not limited to "[X]. [Y] is an entity. Is it correct?" and/or "[X]. [Y] is a [Z] entity. Is it correct?"

Additionally, in one or more implementations, the self-cleaning named entity recognition system 106 utilizes a training sentence and predicted labels (from the NER model) for the training sentence to generate the discriminative prompts. For example, the self-cleaning named entity recognition system 106 extracts entities and corresponding classes from the predicted labels (of the NER model) and transforms the labels into natural words for the discriminative prompt sentences. As an example, given a training sentence [San Jose is a city] and [B-LOC, I-LOC, 0, 0, 0] as predicted labels, the self-cleaning named entity recognition system 106 extracts San Jose as an entity and transforms its class label "LOC" into a meaningful word "location" for a discriminative prompt (e.g., in the templates (6)).

For example, the self-cleaning named entity recognition system 106 utilizes various class labels and mapped natural words for discriminative prompts, such as, but not limited to, PER ("person"), LOC ("location"), ORG ("organization"), MISC ("other"), WORK_OF_ART ("work of art"), PRODUCT ("product"), NORP ("affiliation"), FAC ("facility"), GPE ("geo-political"), EVENT ("event"), LAW ("law"), LANGUAGE ("language"), PERCENT ("percent"), ORDINAL ("ordinal"), QUANTITY ("quantity"), CARDINAL ("cardinal"), TIME ("time"), DATE ("date"), and/or MONEY ("money").

Furthermore, the self-cleaning named entity recognition system 106 utilizes the discriminator model to, in reference to the above mentioned prompt templates (6), fill in "correct" in the [MASK] token when the entity and/or class is appropriate given the context of the sentence X. In one or more embodiments, the self-cleaning named entity recognition system 106 utilizes the discriminator model to, in reference to the above mentioned prompt templates (6), fill in "wrong" in the [MASK] token when the entity and/or class is not appropriate or incorrect given the context of the sentence X. Additionally, in one or more instances, the self-cleaning named entity recognition system 106 generates a discriminative score (e.g., as a discriminator weight) of the evaluated entity and/or class prompts (e.g., an authenticity score) in accordance with the following function:

$$w^e(e) = P_S(\text{correct} | [X] = x, [Y] = e),$$
$$w^c(c) = P_C(\text{correct} | [X] = x, [Y] = e, [Z] = c) \quad (7)$$

In the above-mentioned function (7), the self-cleaning named entity recognition system 106 generates a $P_S$ and a $P_C$ to represent a probability associated with the span prompt (e.g., an authenticity score of an entity label via the discriminative prompt) and the category prompt (e.g., an authenticity score of a class label via the discriminative prompt), respectively.

Moreover, the self-cleaning named entity recognition system 106 utilizes discriminator weights from a discriminator model (based on a predicted label from the NER model) to guide training of the NER model. In some cases, the self-cleaning named entity recognition system 106 utilizes discriminator weights generated utilizing a discriminator model to guide self-training by reweighting the pseudo labels NER model training iterations (e.g., pseudo labels as described in function (5) and/or predicted labels in reference to FIG. 3). For instance, the self-cleaning named entity recognition system 106 extracts predicted entity labels and corresponding predicted class labels and utilizes the predicted labels into the discriminator model using discriminative prompts (e.g., as described in functions (6) and (7)) to determine discriminator weights.

Subsequently, the self-cleaning named entity recognition system 106 utilizes the discriminator weights as a discriminative reweight loss (DRL) (e.g., a weighted measure of loss) in accordance with the following function:

$$\mathcal{L}_{DRL}^{e/c} = -\frac{1}{|D|}\sum_{i=1}^{|D|}\sum_{j=1}^{n} w_{ij}^{e/c} \log f_{\hat{e}_{ij}/\hat{c}_{ij}}^{e/c}(x_{ij}; \theta) \quad (8)$$

In reference to the above mentioned function (8), in one or more embodiments, the self-cleaning named entity recognition system 106 utilizes predicted (or pseudo) entity (or span) labels $\hat{e}_{ij}$ and class (or category) labels $\hat{c}_{ij}$ for a j-th token in an i-th sentence. Moreover, the self-cleaning named entity recognition system 106 utilizes $f_{\hat{e}_{ij}/\hat{c}_{ij}}^{e/c}$ as an entry of $\hat{e}_{ij}$ and $\hat{c}_{ij}$ in a corresponding probability distribution. In some instances, when an entity label applies to multiple tokens (e.g., a multi-worded entity), the self-cleaning named entity recognition system 106 allocates equivalent discriminator weights to the multiple tokens. In some embodiments, the self-cleaning named entity recognition system 106 utilizes a token-wise discriminator that determines separate discriminator weights for each token in a sentence (e.g., a multi-worded entity receives a separate discriminator weight per token in the multi-worded entity). Additionally, in one or more instances, the self-cleaning named entity recognition system 106 utilizes a pre-configured discriminator weight for negative entity (or span) labels (e.g., for non-entity tokens) to avoid overfitting on the negative entity labels (e.g., a pre-configured discriminator weight, such as, but not limited to, 0.4, 0.5, and/or 0.6).

As also shown in FIG. 3, the self-cleaning named entity recognition system 106, in one or more implementations, utilizes demonstrations (from the guidance training data set 315) to train the NER model 302. In particular, as shown in FIG. 3, the self-cleaning named entity recognition system 106 identifies demonstration data 320 (e.g., a demonstration sentence from the guidance training data set 315 with ground truth labels for the demonstration sentence) that is similar to the training sentence 304. Furthermore, the self-cleaning named entity recognition system 106 utilizes the ground truth labels from the demonstration data 320 (e.g., "San Jose is a Location Entity" and "New York is an Entity") as a clean demonstration while causing the NER model 302 to determine the predicted label(s) 308 for the training sentence 304.

In particular, in one or more embodiments, the self-cleaning named entity recognition system 106 utilizes a clean demonstration mechanism to enhance a robustness of training labels (e.g., pseudo and/or predicted labels) used to train the NER model. For instance, the self-cleaning named entity recognition system 106 utilizes ground truth labels (or prompts based on the ground truth labels) from a guidance training set (e.g., the guidance training data set 315) as demonstrations to elicit robust predictions from the NER model. In some cases, the self-cleaning named entity recognition system 106 further utilizes the enhanced outputs of the NER model, from the clean demonstration mechanism, as pseudo labels for self-training (as described above).

In one or more implementations, the self-cleaning named entity recognition system 106 identifies demonstration sentences from the guidance sentences based on similarities to a training sentence (from a noisy training data set). For instance, the self-cleaning named entity recognition system 106 compares the training sentence (from the noisy training data set) to one or more sentences in the guidance training data set to identify a similar demonstration sentence. In some cases, the self-cleaning named entity recognition system 106 utilizes an instance-oriented method to identify demonstration sentences. To illustrate, in one or more embodiments, the self-cleaning named entity recognition system 106 retrieves similar sentences from a guidance training data set (for a sentence from the noisy training data set) utilizing a semantic textual similarity score (e.g., an SBERT score). In some cases, the self-cleaning named entity recognition system 106 utilizes various comparison and/or similarity scoring methods to identify demonstration sentences from a guidance training data set for a training sentence from the noisy training data set, such as, but not limited to, k-means clustering, Euclidean distance, pre-trained language models, and/or cosine similarities.

For instance, in some cases, the self-cleaning named entity recognition system 106 utilizes demonstration and instance-oriented demonstration identification as described in Hongxin Zhang et. al., Robustness of Demonstration-based Learning Under Limited Data Scenario, available at https://arxiv.org/pdf/2210.10693.pdf (2022) and in Dong-Ho Lee et. al., Good Examples Make a Faster Learner: Simple Demonstration-based Learning for Low-Resource NER, available at https://arxiv.org/pdf/2110.08454.pdf (2022), content of which is hereby incorporated by reference in its entirety. In addition, in some cases, the self-cleaning named entity recognition system 106 utilizes semantic textual similarity scores as described in Nils Reimers et. al., Sentence-BERT: Sentence Embeddings Using Siamese BERT-Networks, Ubiquitous Knowledge Processing Lab (UKP-TUDA), available at https://arxiv.org/pdf/1908.10084.pdf (2019), content of which is hereby incorporated by reference in its entirety.

Moreover, in one or more instances, the self-cleaning named entity recognition system 106 utilizes the identified demonstration sentence as a clean demonstration while training the NER model utilizing the training sentence (from the noisy training data set). For instance, the self-cleaning named entity recognition system 106 utilizes a demonstration sentence $\tilde{x}$ with an original training sentence x to train the NER model. In particular, in one or more embodiments, the self-cleaning named entity recognition system 106 appends the demonstration sentence $\tilde{x}$, as additional tokens, to the original training sentence x such that the input for the NER model is [x, $\tilde{x}$]. Then, the self-cleaning named entity recognition system 106 utilizes the appended input [x, $\tilde{x}$] to train the NER model in accordance with one or more implementations herein. In some embodiments, the self-cleaning named entity recognition system 106 further utilizes demonstration sentence identification and the above-described clean demonstration mechanism during inference of an NER model (to accurately identify entities and/or entity classes from text inputs).

In some instances, the self-cleaning named entity recognition system 106 further trains the NER model utilizing the guidance training data set (e.g., the guidance training data set 315). Indeed, in one or more embodiments, the self-cleaning named entity recognition system 106 utilizes a guidance training data set to fine tune the training of the NER model. In particular, in one or more instances, the self-cleaning named entity recognition system 106 fine-tunes a trained NER model (e.g., trained in accordance with one or more implementations herein) by further training the NER model using the guidance training data set.

Although FIG. 3 illustrates various components of the self-cleaning named entity recognition system 106 utilizing a self-cleaning, self-training guided denoising framework through a discriminator model to improve NER learning on noisy training data, the self-cleaning named entity recognition system 106, in some cases, trains the NER model using various combinations of the components present in the above-mentioned framework. For example, in some cases, the self-cleaning named entity recognition system 106 trains the NER model with the denoising framework of the discriminator model without utilizing clean demonstration. In some cases, the self-cleaning named entity recognition system 106 utilizes clean demonstration to generate predicted labels from the NER label and, then, utilizes the discriminator model to reweight the training data (and/or predicted label loss) utilized for the NER model.

Furthermore, the self-cleaning named entity recognition system 106 utilizes various types of values for authenticity scores and/or discriminator weights. For instance, the self-cleaning named entity recognition system 106 utilizes a variety of values for the authenticity scores and/or discriminator weights, such as, but not limited to, a 0 to 1 range, a 0 to 100 range, ranked categories (e.g., A through F, 1 through 10).

Additionally, as shown in FIG. 3 (and described above), in one or more embodiments, the self-cleaning named entity recognition system 106 determines varying discriminator weights for varying predicted labels. For instance, the self-cleaning named entity recognition system 106 determines varying discriminator weights (e.g., additional discriminator weights) for predicted labels (e.g., predicted entity labels and/or predicted class labels) for different training sentences (or inputs). As an example, the self-cleaning named entity recognition system, for an additional training sentence, determines an additional predicted label. In addition, in one or more instances, the self-cleaning named entity recognition system 106 utilizes the additional predicted label with a discriminator model to determine an additional discriminator weight (e.g., different from a discriminator weight belonging to a predicted label from another training sentence) for the additional predicted label. Indeed, in one or more cases, the self-cleaning named entity recognition system 106 trains the NER model for multiple training sentences utilizing the varying discriminator weights.

As mentioned above, in one or more instances, the self-cleaning named entity recognition system 106 co-trains the discriminator model with the NER model. In particular, in one or more cases, the self-cleaning named entity recognition system 106 utilizes high quality predictions from the NER model to augment the guidance training data set utilized by the discriminator model. For example, FIG. 4 illustrates the self-cleaning named entity recognition system 106 augmenting the guidance training data set utilized by a discriminator model using predicted labels from the NER model.

Figure 4:
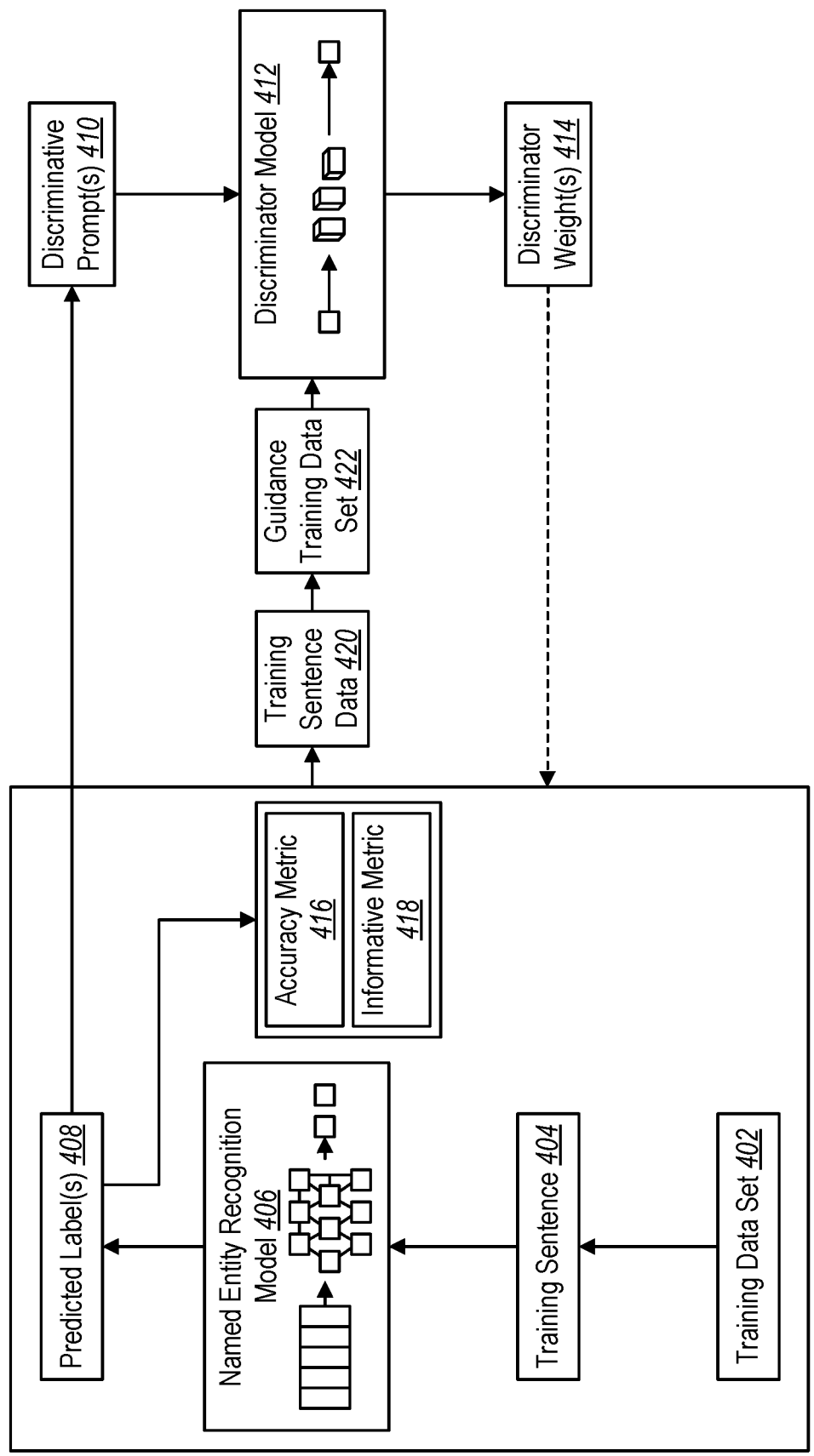
FIG. 4 illustrates a self-cleaning named entity recognition system augmenting a guidance training data set utilized by a discriminator model in accordance with one or more implementations.

As shown in FIG. 4, the self-cleaning named entity recognition system 106 utilizes a training sentence 404 from a training data set 402 (e.g., a noisy training data set) with a named entity recognition model 406 to generate predicted label(s) 408 for the training sentence 404. Indeed, the self-cleaning named entity recognition system 106 generates the predicted label(s) 408 in accordance with one or more implementations herein (e.g., entity labels, entity class labels). As also shown in FIG. 4, the self-cleaning named entity recognition system 106 utilizes the predicted label(s) 408 in a discriminative prompt(s) 410 (as described above) as input for a discriminator model 412. Indeed, as shown in FIG. 4, the self-cleaning named entity recognition system 106 utilizes the discriminative prompt(s) 410 with the discriminator model 412 to generate a discriminator weight(s) 414 (e.g., indicating an authenticity (or correctness) of the predicted label(s) 408).

Additionally, as shown in FIG. 4, the self-cleaning named entity recognition system 106 utilizes the predicted label(s) 408 and the discriminator weight(s) 414 to generate an accuracy metric 416 and/or an informative metric 418 for the predicted label(s) 408. Furthermore, in reference to FIG. 4, the self-cleaning named entity recognition system 106 utilizes the accuracy metric 416 and/or the informative metric 418 to determine whether the predicted label(s) 408 are introduced into a guidance training data set (e.g., as high quality training data for a discriminator model). Indeed, as shown in FIG. 4, upon determining to include the predicted label(s) 408 for training the discriminator model 412 via the accuracy metric 416 and/or the informative metric 418, the self-cleaning named entity recognition system 106 provides training sentence data 420 (e.g., the predicted label(s) 408 and the training sentence 404) to the guidance training data set 422.

In some cases, as shown in FIG. 4, the self-cleaning named entity recognition system 106 determines the accuracy metric 416 for the predicted label(s) 408. For instance, the self-cleaning named entity recognition system 106 utilizes a similarity measurement to evaluate an accuracy of a predicted label (e.g., with a ground truth label). For example, the self-cleaning named entity recognition system 106 utilizes Jensen-Shannon divergence (JSD) as a proxy to evaluate an accuracy of the predicted label(s) 408 (or pseudo labels) of a token $x_i$ (from the training sentence 404) in accordance with the following function:

$$q(\hat{e}_i) = 1 - JSD(f^e(x_i) \| \text{one\_hot}(e_i)), \quad (9)$$
$$q(\hat{c}_i) = 1 - JSD(f^c(x_i) \| \text{one\_hot}(c_i))$$

In the above mentioned function (9), the self-cleaning named entity recognition system 106 represents $\hat{e}_i$ and $\hat{c}_i$ as predicted (pseudo) entity labels and predicted (pseudo) entity class labels for a token $x_i$. Moreover, in the function (9), the self-cleaning named entity recognition system 106 utilizes $f^e(x_i)$ and $f^c(x_i)$ as probabilities for the entity labels and entity class labels from the NER model (e.g., from an entity head and a classification head). Moreover, in reference to function (9), the self-cleaning named entity recognition system 106 utilizes a ground truth entity label (from the training data) $e_i$ and a ground truth entity class label $c_i$ (e.g., transformed into distributions using one-hot encoding).

Indeed, in the function (9), the self-cleaning named entity recognition system 106 determines an accuracy metric $q(\hat{e}_i)$ for the entity label and an accuracy metric $q(\hat{c}_i)$ for the entity class label. Although one or more implementations describe utilizing a Jensen-Shannon divergence as a proxy for the accuracy metric, in one or more implementations, the self-cleaning named entity recognition system 106 utilizes various similarity measurements, such as, but not limited to, Kullback-Leibler Divergence, cosine similarity, and/or Euclidean distances.

Furthermore, as shown in FIG. 4, the self-cleaning named entity recognition system 106 determines an informative metric 418 for the predicted label(s) 408. In one or more instances, the self-cleaning named entity recognition system 106 utilizes the discriminator weight(s) 414 to generate the informative metric 418. In particular, in one or more cases, the self-cleaning named entity recognition system 106 determines an informative metric for the predicted labels based on the discriminator model demonstrated uncertainty for its own prediction. Indeed, in one or more implementations, the self-cleaning named entity recognition system 106 determines that a particular predicted label (e.g., a predicted entity label and/or predicted entity class label) is more informative as a discriminator model demonstrates a higher uncertainty in the discriminator model prediction.

To illustrate, in some cases, the self-cleaning named entity recognition system 106 utilizes a discriminator model determined discriminator weight (in accordance with one or more implementations) to determine an informative metric. For example, the self-cleaning named entity recognition system 106 utilizes a prediction entropy of a discriminator model as a measure of uncertainty via token-level selection scores s(•) in accordance with the following function:

$$s(\hat{e}_i) = \mathbb{H}(w^e(\hat{e}_i)) \cdot q(\hat{e}_i), \quad (10)$$
$$s(\hat{c}_i) = \mathbb{H}(w^c(\hat{c}_i)) \cdot q(\hat{c}_i)$$

In the above-mentioned function (10), the self-cleaning named entity recognition system 106 utilizes an entropy function $\mathbb{H}$ with discriminative scores (based on authenticity scores or weights) $w^e(\hat{e}_i)$ and $w^c(\hat{c}_i)$ of the predicted (or pseudo) labels (e.g., a predicted entity label and/or predicted entity class label). Indeed, the self-cleaning named entity recognition system 106 determines an informative metric (e.g., scores s(•)) utilizing output discriminator weights and accuracy metrics (from predicted labels) ($q(\hat{e}_i)$ and $q(\hat{c}_i)$).

In one or more embodiments, the self-cleaning named entity recognition system 106 selects one or more predicted label and training sentence pairs to augment a guidance training data set for the discriminator model. For instance, in reference to function (10), the self-cleaning named entity recognition system 106 forms an entity-level selection score utilizing the token-level scores within an entity. For example, the self-cleaning named entity recognition system 106 generates entity-level selection scores by averaging the token-level scores in accordance with the following functions:

$$\frac{1}{L}\sum_i^L s(\hat{e}_i), \quad (11)$$
$$\frac{1}{L}\sum_i^L s(\hat{c}_i)$$

In the above-mentioned function (11), the self-cleaning named entity recognition system 106 utilizes an L number of tokens in the entity. Moreover, in one or more embodiments, the self-cleaning named entity recognition system 106 selects a top-K (e.g., with a hyper-parameter K) entities as pseudo labels to add to the guidance training data set for the discriminator model (e.g., using a top-K entity-level selection scores). Although function (11) describes utilizing an average, the self-cleaning named entity recognition system 106, in one or more embodiments, utilizes various approaches to generate entity-level selection scores, such as, but not limited to, medians, modes, and/or summations.

In some instances, the self-cleaning named entity recognition system 106 utilizes a threshold activity metric and/or a threshold informative metric (e.g., administrator selected thresholds, machine-learned thresholds) to select one or more predicted label and training sentence pairs to augment a guidance training data set for the discriminator model. For example, the self-cleaning named entity recognition system 106 identifies predicted labels and training sentence pairings that include an activity metric that satisfies a threshold activity metric and/or an informative metric that satisfies a threshold informative metric. Then, in one or more embodiments, the self-cleaning named entity recognition system 106 adds the predicted labels and training sentence pairings to the guidance training data set.

In addition to adding one or more positive predicted label and training sentence training pairs to the guidance training data set, in one or more embodiments, the self-cleaning named entity recognition system 106 also simulates negative training samples for the guidance training data set. For instance, the self-cleaning named entity recognition system 106 creates negative entity samples (e.g., training samples) by adding and/or removing one or more words within entity words for a training sample from the guidance training data set. In some cases, the self-cleaning named entity recognition system 106 randomly adds and/or removes one or more words within entity words to create negative entity samples. As an example, the self-cleaning named entity recognition system 106 transforms "Arizona State University" into "State University" as a negative entity sample.

Additionally, in one or more embodiments, the self-cleaning named entity recognition system 106 also creates negative training samples for entity class labels in the guidance training data set. For instance, the self-cleaning named entity recognition system 106 randomly flips classes of entities in a guidance set to generate negative entity class training samples. As an example, the self-cleaning named entity recognition system 106 changes a person class label for a token (or word) "Austin" to a location class label.

Moreover, in one or more embodiments, the self-cleaning named entity recognition system 106 trains a discriminator model. In particular, the self-cleaning named entity recognition system 106 trains a discriminator model utilizing ground truth entity labels and/or ground truth entity class labels with authenticity predictions from the discriminator model. Furthermore, FIG. 5 illustrates the self-cleaning named entity recognition system 106 utilizes a guidance training data set to train a discriminator model to detect various noise and/or error types (e.g., span errors, category errors, semantic errors).

Figure 5:
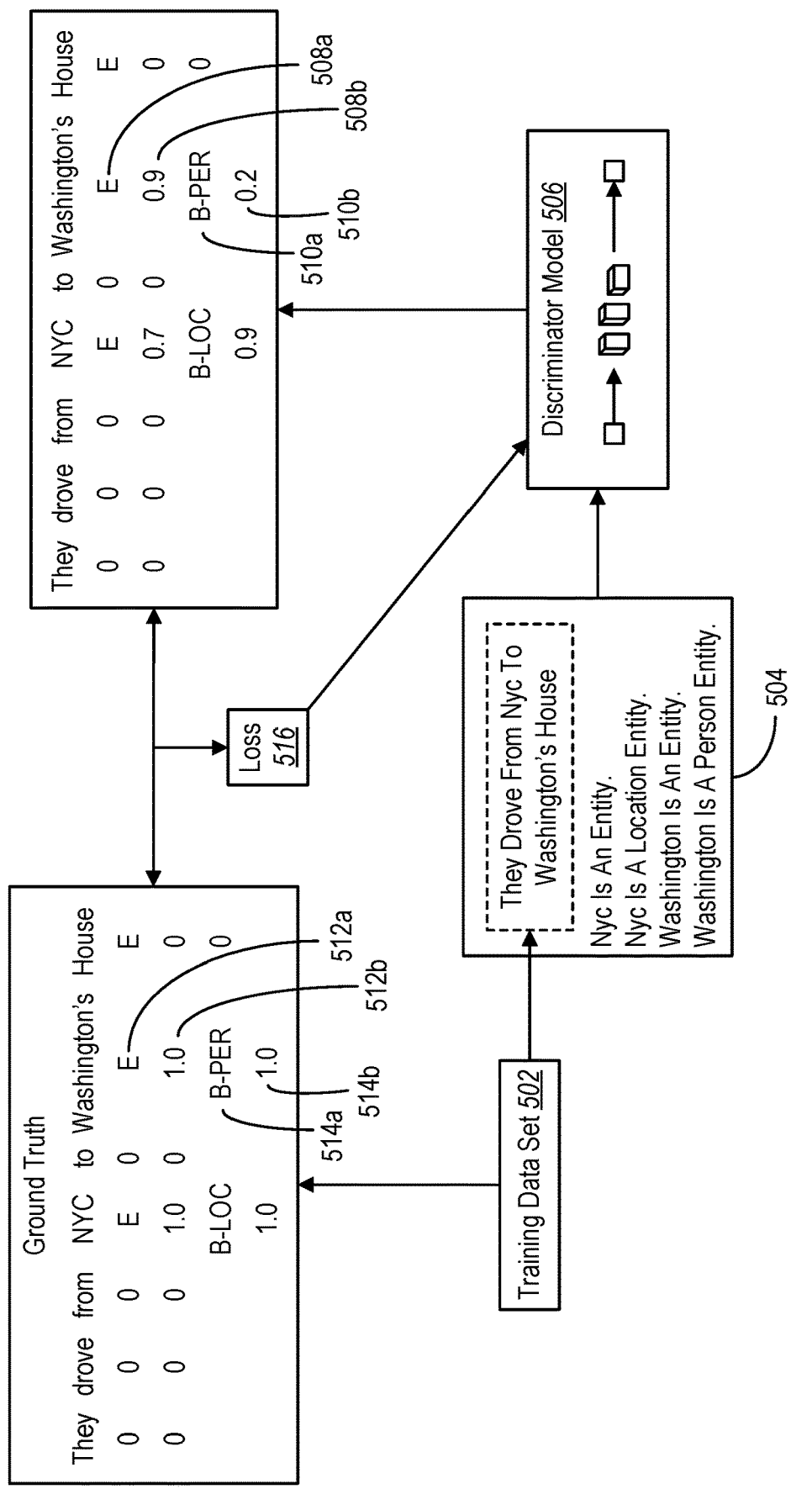
FIG. 5 illustrates a self-cleaning named entity recognition system utilizing a guidance training data set to train a discriminator model in accordance with one or more implementations.

For example, as shown in FIG. 5, the self-cleaning named entity recognition system 106 utilizes a training sentence 504 with one or more discriminative prompts from a training data set 502 (e.g., a guidance training data set) as input for a discriminator model 506. Indeed, as shown in FIG. 5, the self-cleaning named entity recognition system 106 utilizes the discriminator model 506 to generate authenticity predictions for entity labels (e.g., an entity label 508a) and entity class labels (e.g., an entity class label 510a). As an example, in FIG. 5, the discriminator model 506 determines that "Washington's" from the training sentence 504 is a correct entity with an authenticity score 508b of 0.9 (e.g., a high confidence of correctness). In addition, as shown in FIG. 5, the discriminator model 506 also determines that the "Washington's" entity is a correct "person entity" with an authenticity score 510b of 0.2 (e.g., a low confidence of correctness).

Additionally, as shown in FIG. 5, the self-cleaning named entity recognition system 106 compares the authenticity score 508b with a ground truth authenticity score 512b for the entity label 512a (e.g., using ground truth data from the training data set 502). Indeed, in some cases, the self-cleaning named entity recognition system 106 determines a loss 516 based on the comparison of the authenticity score 508b with the ground truth authenticity score 512b (e.g., a lower measure of loss due to the accuracy of the authenticity score 508b). Moreover, as also shown in FIG. 5, the self-cleaning named entity recognition system 106 compares the authenticity score 510b with a ground truth authenticity score 514b for the entity label 514a. Indeed, the self-cleaning named entity recognition system 106, in one or more embodiments, determines the loss 516 based on the comparison of the authenticity score 510b and the ground truth authenticity score 514b (e.g., a greater measure of loss due to the inaccuracy of the authenticity prediction of the authenticity score 508b).

In addition, as shown in FIG. 5, the self-cleaning named entity recognition system 106 utilizes the loss 516 to train the discriminator model 506. In some cases, the self-cleaning named entity recognition system 106 iteratively modifies parameters of the discriminator model 506 to generate outputs that minimize the loss 516. Indeed, in one or more instances, the self-cleaning named entity recognition system 106 modifies parameters of the discriminator model 506 utilizing backpropagation of the loss 516.

As an example, the self-cleaning named entity recognition system 106 trains the discriminator model to minimize the following function:

$$\mathcal{L}_w = \qquad (12)$$
$$-\mathbb{E}_{e,c \sim C}[\log w^e(e) + \log w^c(c)] - \mathbb{E}_{\tilde{e}, \tilde{c} \sim B}[\log(1 - w^e(\tilde{e})) + \log(1 - w^c(\tilde{c}))]$$

In the above mentioned function (12), the self-cleaning named entity recognition system 106 represents $(1-w^e(\tilde{e}))$ as $P_S(\text{wrong}|\bullet, \tilde{e})$ and $(1-w^c(\tilde{c}))$ as $P_C(\text{wrong}|\bullet, \tilde{c})$ (e.g., in reference to function (7)). In one or more embodiments, the self-cleaning named entity recognition system 106 utilizes various types of losses for training the discriminator model (and/or the NER model), such as, but not limited to cross-entropy loss, mean squared error loss, and/or mean absolute error loss.

Figure 6:
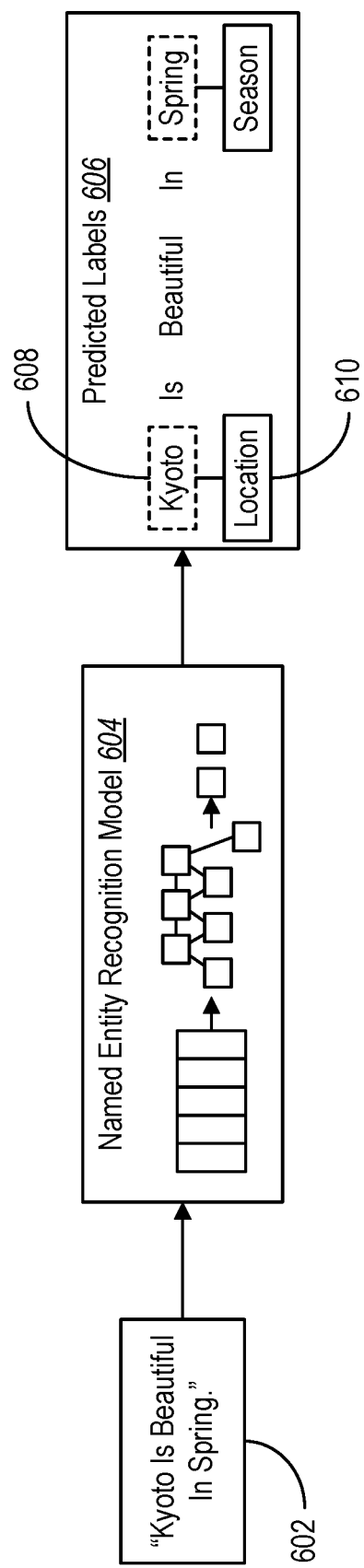
FIG. 6 illustrates a self-cleaning named entity recognition system utilizing an NER model at inference in accordance with one or more implementations.

Furthermore, FIG. 6 illustrates an NER model at inference (upon training in accordance with one or more implementations herein). As shown in FIG. 6, the self-cleaning named entity recognition system 106 provides a sentence 602 (e.g., "Kyoto is beautiful in spring") to the named entity recognition model 604. As further shown in FIG. 6, the self-cleaning named entity recognition system 106 utilizes the named entity recognition model 604 with the sentence 602 to generate predicted labels 606 for the training sentence. As shown in FIG. 6, the named entity recognition model 604 generates predicted labels 606 that indicate the word "Kyoto" as an entity label 608 and a class label 610 of "location." Additionally, as shown in FIG. 6, the named entity recognition model 604 also generates predicted labels 606 that indicate the word "spring" as an entity with a class label of "season."

Although one or more embodiments herein describe utilizing a self-cleaning guided denoising framework to improve NER learning on noisy training data via a guidance training set, the self-cleaning named entity recognition system 106, in some implementations, utilizes the self-cleaning guided denoising framework to improve various types of machine learning on noisy training data. For instance, in some cases, the self-cleaning named entity recognition system 106 utilizes the self-cleaning guided denoising framework (in accordance with one or more implementations herein) to improve training of a text classifier (e.g., that classifies sentences and/or text documents) into classes (e.g., subjects, categories, etc.) and/or an image classification machine learning model.

As mentioned above, the self-cleaning named entity recognition system 106 improves the accuracy of an NER model. To illustrate, experimenters utilized an implementation of a self-cleaning named entity recognition system (as described above) (hereinafter referred to as "Self-Cleaning") to compare results with various conventional systems. In particular, the experimenters conducted experiments using two noisy NER training datasets: a crowdsourced NER dataset based on CoNLL03 (as described in Filipe Rodrigues et. al., Deep Learning from Crowds, available at https://arxiv.org/pdf/1709.01779.pdf (2017)) and a distant supervision dataset created using the BOND approach (as described in Chen Liang et. al., BOND: BERT-Assisted Open-Domain Named Entity Recognition with Distant Supervision, Proceedings of the 26$^{th}$ ACM SIGKDD International Conference on Knowledge Discovery & Data Mining, available at https://arxiv.org/pdf/2006.15509.pdf (2020), hereinafter Liang) on the following knowledge bases: CoNLL03 as described in Erik F. Tjong Kim Sang et. al., Introduction to The CoNLL-2003 Shared Task: Language-Independent Named Entity Recognition, available at https://arxiv.org/pdf/cs/0306050.pdf (2003), OntoNotes5.0 as described in Ralph Weishedel et. al., OntoNotes Release 5.0, available at https://catalog.ldc.upenn.edu/LDC2013T19 (2013), and Wikigold as described in Dominic Balasuriya et. al., Named Entity Recognition in Wikipedia, Proceedings of the 2009 Workshop on the People's Web Meets NLP: Collaboratively Constructed Semantic Resources (People's Web), pages 10-18 (2009). The experimenters further create a guidance set from the above-mentioned training sets for an implementation of the self-cleaning named entity recognition system (as described herein) and one or more baseline conventional systems that utilize other guidance training approaches.

Indeed, the experimenters compare the implementation of the self-cleaning named entity recognition system with two types of baseline models. For example, the experimenters utilize the following baseline models that train on noisy labels without separate clean data: Distant ROBERTa (a ROBERTa model as described in Yinhan Liu trained using noisy labels), BOND (as described in Liang), and RoSTER (as described in Yu Meng et. al., Distantly-Supervised Named Entity Recognition with Noise-Robust Learning and Language Model Augmented Self-Training, available at https://arxiv.org/pdf/2109.05003.pdf (2021)). In addition, the experimenters also utilize the following baseline models that train using a guidance set via various other guidance training approaches: Fine-tune ROBERTa (a ROBERTa model as described in Yinhan Liu trained using the guidance training set), Fine-tune RoSTER (a RoSTER model trained using the guidance training set, NEEDLE (as described in Haoming Jiang et. al., Named Entity Recognition with Small Strongly Labeled and Large Weakly Labeled Data, available at https://arxiv.org/pdf/2106.08977.pdf (2021)), GLC (as described in Dan Hendrycks et. al., Using Trained Data to Train Deep Networks on Labels Corrupted by Severe Noise, available at https://arxiv.org/pdf/1802.05300.pdf (2019)), and Meta-Reweight (as described in Linzhi Wu et. al., Robust Self-Augmentation for Named Entity Recognition with Meta Reweighting, available at https://arxiv.org/pdf/2204.11406.pdf (2022) and Jun Shu et. al., Meta-Weight-Net: Learning an Explicit Mapping for Sample Weighting, available at https://arxiv.org/pdf/1902.07379.pdf (2019)).

Indeed, the experimenters collected precision, recall, and F1-scores for results of the baseline models and an implementation of the self-cleaning named entity recognition system (as described above) upon training using the crowdsourced NER dataset and the distant supervision dataset (described above). As shown in the following Tables 1 and 2, the implementation of the self-cleaning named entity recognition system outperforms the baseline models in precision, recall, and F1-scores across training via the crowdsourced NER dataset (Table 1) and the distant supervision dataset (Table 2).

TABLE 1

| Methods | Precision | Recall | F1 |
| --- | --- | --- | --- |
| Distant RoBERTa | 0.824 | 0.796 | 0.805 |
| BOND | 0.775 | 0.806 | 0.787 |
| RoSTER | 0.790 | 0.822 | 0.804 |
| Fine-tune RoBERTa | 0.695 | 0.699 | 0.694 |
| Fine-Tune RoSTER | 0.778 | 0.831 | 0.802 |
| NEEDLE | 0.822 | 0.863 | 0.842 |
| GLC | 0.803 | 0.791 | 0.790 |
| Meta-Reweight | 0.768 | 0.835 | 0.799 |
| Self-Cleaning | 0.849 | 0.876 | 0.862 |

TABLE 2

| Methods | CoNLL03 | | | OntoNotes5.0 | | | Wikigold | | |
| --- | --- | --- | --- | --- | --- | --- | --- | --- | --- |
| | Pre. | Rec. | F1 | Pre. | Rec. | F1 | Pre. | Rec. | F1 |
| Distant RoBERTa | 0.784 | 0.756 | 0.843 | 0.760 | 0.715 | 0.737 | 0.534 | 0.623 | 0.566 |
| BOND | 0.849 | 0.854 | 0.848 | 0.740 | 0.767 | 0.753 | 0.541 | 0.679 | 0.595 |
| RoSTER | 0.856 | 0.867 | 0.859 | 0.759 | 0.792 | 0.771 | 0.581 | 0.716 | 0.637 |
| Fine-tune RoBERTa | 0.695 | 0.699 | 0.694 | 0.744 | 0.822 | 0.779 | 0.493 | 0.551 | 0.509 |
| Fine-Tune RoSTER | 0.850 | 0.872 | 0.860 | 0.756 | 0.797 | 0.773 | 0.620 | 0.755 | 0.675 |

TABLE 2-continued

| Methods | CoNLL03 | | | OntoNotes5.0 | | | Wikigold | | |
| --- | --- | --- | --- | --- | --- | --- | --- | --- | --- |
| | Pre. | Rec. | F1 | Pre. | Rec. | F1 | Pre. | Rec. | F1 |
| NEEDLE | 0.861 | 0.877 | 0.866 | 0.730 | 0.782 | 0.751 | 0.707 | 0.777 | 0.738 |
| GLC | 0.866 | 0.853 | 0.856 | — | — | — | 0.626 | 0.754 | 0.679 |
| Meta-Reweight | 0.839 | 0.866 | 0.851 | 0.737 | 0.781 | 0.755 | 0.609 | 0.746 | 0.665 |
| Self-Cleaning | 0.883 | 0.882 | 0.882 | 0.809 | 0.846 | 0.826 | 0.761 | 0.798 | 0.778 |

Additionally, experimenters also conducted ablation studies to demonstrate individual contributions of different components of an implementation of a self-cleaning named entity recognition system (as described above). In particular, experimenters utilized variants of the above-described self-cleaning named entity recognition system with (1) entity (or span) prompts removed (e.g., "w/o Span Disc."), (2) class (or category) prompts removed (e.g., "w/o Cat. Disc."), (3) clean demonstration removed (e.g., "w/o Demonstration"), and (4) using the discriminator without augmentation from NER predicted labels (e.g., "w/o Co-training"). In addition, the experimenters utilized a Stage I variant (e.g., self-training the NER model with demonstrations from the guidance set) and a Stage II variant (e.g., self-cleaning the NER model with the discriminator model and the guidance set). Indeed, Table 3 demonstrates the results of the ablation study.

TABLE 3

| Methods | Type | Noise Rate | | |
| --- | --- | --- | --- | --- |
| | | 0.2 | 0.4 | 0.6 |
| RoSTER | Span | 0.852 | 0.823 | 0.462 |
| | Cat. | 0.886 | 0.873 | 0.667 |
| Self-Cleaning | Span | 0.901 | 0.897 | 0.896 |
| | Cat. | 0.899 | 0.895 | 0.864 |

Moreover, the experimenters utilized varying noise rates in a noisy NER training data set (by creating datasets based on CoNLL03 with varying noise rates that controls the addition or removal of noise from the data set). Then, the experimenters utilized an implementation of a self-cleaning named entity recognition system (as described above) and RoSTER (as a baseline) to compare results of training the models using the varying noise rate noisy training data sets. As shown in the following Table 4, as the noise rate increased, performance of RoSTER decreases significantly whereas an implementation of the self-cleaning named entity recognition system maintains performance.

TABLE 4

| Methods | Precision | Recall | F1 |
| --- | --- | --- | --- |
| w/o Span Disc. | 0.866 | 0.885 | 0.874 |
| w/o Cat. Disc. | 0.878 | 0.879 | 0.877 |
| w/o Demonstration | 0.888 | 0.873 | 0.878 |
| w/o Co-training | 0.882 | 0.877 | 0.878 |
| Stage I | 0.861 | 0.888 | 0.874 |
| Stage II | 0.881 | 0.879 | 0.880 |
| Self-Cleaning | 0.883 | 0.882 | 0.882 |

Figure 7:
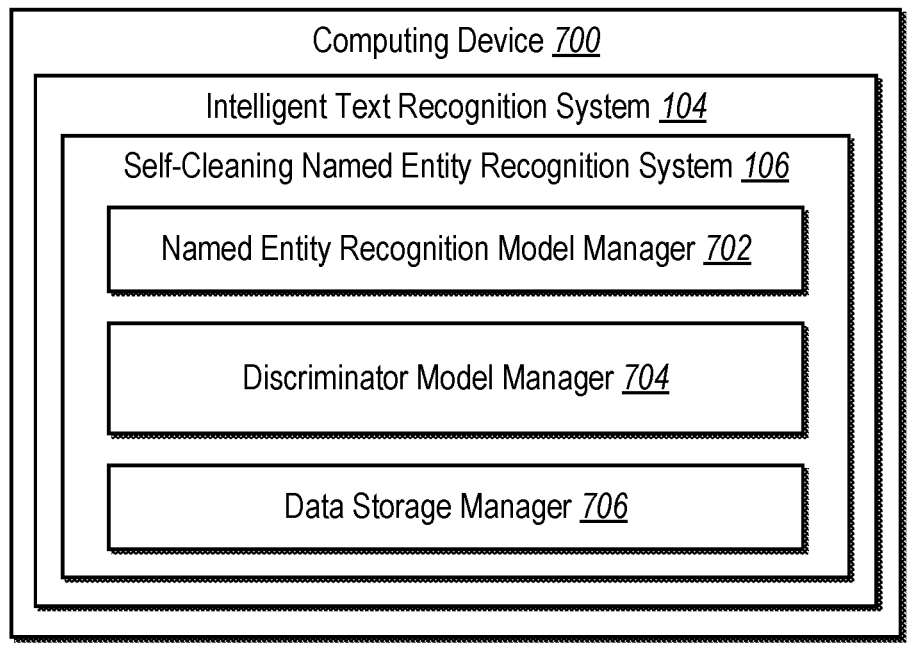
FIG. 7 illustrates a schematic diagram of a self-cleaning named entity recognition system in accordance with one or more implementations.

Turning now to FIG. 7, additional detail will be provided regarding components and capabilities of one or more embodiments of the self-cleaning named entity recognition system. In particular, FIG. 7 illustrates an example self-cleaning named entity recognition system 106 executed by a computing device 700 (e.g., the server device(s) 102, client device 110, and/or the administrator device 116). As shown by the embodiment of FIG. 7, the computing device 700 includes or hosts the intelligent text recognition system 104 and the self-cleaning named entity recognition system 106. Furthermore, as shown in FIG. 7, the intelligent text recognition system 104 includes a named entity recognition model manager 702, a discriminator model manager 704, and data storage manager 706.

As just mentioned, and as illustrated in the embodiment of FIG. 7, the self-cleaning named entity recognition system 106 includes the named entity recognition model manager 702. For example, the named entity recognition model manager 702 trains training an NER model with noisy training data through a self-cleaning discriminator model as described above (e.g., in relation to FIGS. 2-3). In addition, in one or more embodiments, the named entity recognition model manager 702 also utilizes predicted labels from an NER model to augment training data for a discriminator model as described above (e.g., in relation to FIG. 4). Indeed, in one or more cases, the named entity recognition model manager 702 also utilizes a trained NER model, during inference, to predict (or determine) labels (e.g., entity and/or entity class labels) for one or more text (or audio) inputs as described above (e.g., in relation to FIGS. 1, 2, and 6).

Moreover, as shown in FIG. 7, the self-cleaning named entity recognition system 106 includes the discriminator model manager 704. In some cases, the discriminator model manager utilizes a discriminator model with predicted labels of an NER model to detect noisy NER labels and reweight the noisy NER labels provided for training in the NER model (e.g., via discriminator weights and discriminative prompts from the NER labels) as described above (e.g., in relation to FIGS. 2 and 3). In some implementations, the discriminator model manager 704 further trains a discriminator model to detect various noise and/or error types from NER training data (e.g., span errors, category errors, semantic errors) utilizing a clean, guidance training data set as described above (e.g., in relation to FIGS. 4 and 5).

As further shown in FIG. 7, the self-cleaning named entity recognition system 106 includes the data storage manager 706. In some embodiments, the data storage manager 706 maintains data to perform one or more functions of the self-cleaning named entity recognition system 106. For example, the data storage manager 706 includes machine learning models (e.g., NER models, discriminator models), machine learning model parameters, training data (e.g., a noisy training data set, a guidance training data set), discriminator weights, accuracy and/or informative metrics for NER predicted labels, discriminative prompts, and/or other components of a machine learning model (e.g., NER models, discriminator models).

Each of the components 702-706 of the computing device 700 (e.g., the computing device 700 implementing the self-cleaning named entity recognition system 106), as shown in FIG. 7, may be in communication with one another using any suitable technology. The components 702-706 of the computing device 700 can comprise software, hardware, or both. For example, the components 702-706 can comprise one or more instructions stored on a computer-readable storage medium and executable by processor of one or more computing devices. When executed by the one or more processors, the computer-executable instructions of the self-cleaning named entity recognition system 106 (e.g., via the computing device 700) can cause a client device and/or server device to perform the methods described herein. Alternatively, the components 702-706 and their corresponding elements can comprise hardware, such as a special purpose processing device to perform a certain function or group of functions. Additionally, the components 702-706 can comprise a combination of computer-executable instructions and hardware.

Furthermore, the components 702-706 of the self-cleaning named entity recognition system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-706 may be implemented as a stand-alone application, such as a desktop or mobile application. Furthermore, the components 702-706 may be implemented as one or more web-based applications hosted on a remote server. The components 702-706 may also be implemented in a suite of mobile device applications or "apps." To illustrate, the components 702-706 may be implemented in an application, including but not limited to, ADOBE SENSEI, ADOBE ILLUSTRATOR, ADOBE ACROBAT READER, ADOBE PRINT, and ADOBE PHOTOSHOP. "ADOBE," "ADOBE SENSEI," "ADOBE ILLUSTRATOR," "ADOBE ACROBAT READER," "ADOBE PRINT," and "ADOBE PHOTOSHOP" are either registered trademarks or trademarks of Adobe Inc. in the United States and/or other countries.

Figure 8:
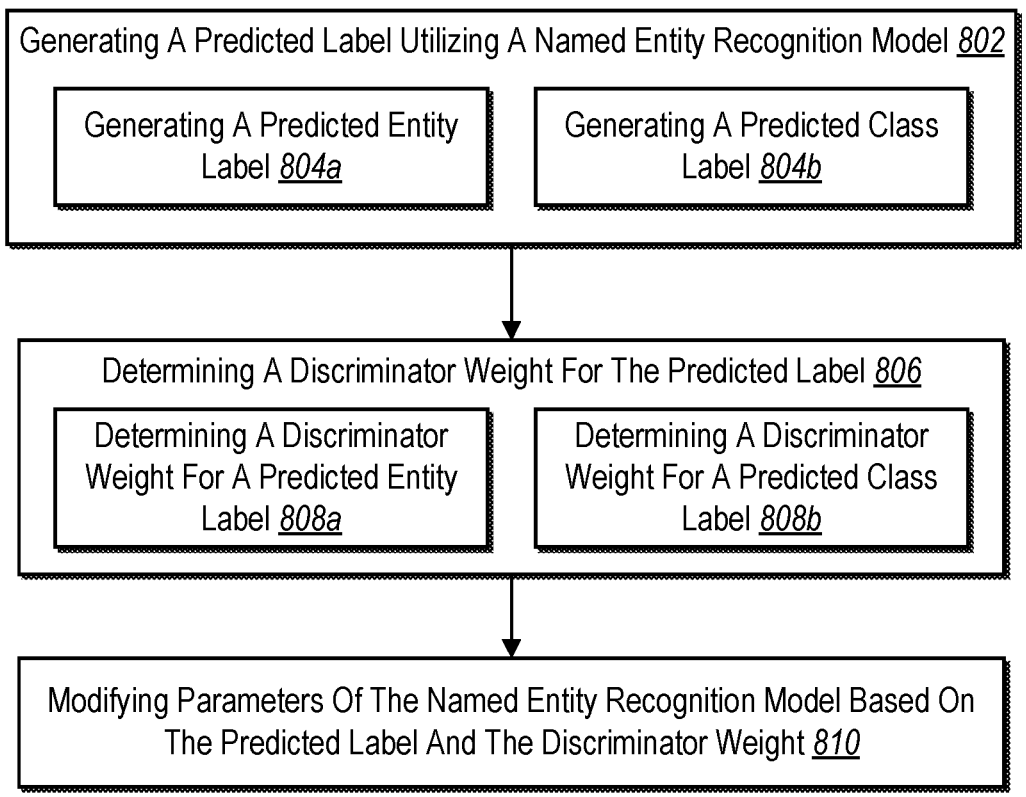
FIG. 8 illustrates a flowchart of a series of acts for training an NER model with noisy training data through a self-cleaning discriminator model in accordance with one or more implementations.

FIGS. 1-7, the corresponding text, and the examples provide a number of different methods, systems, devices, and non-transitory computer-readable media of the self-cleaning named entity recognition system 106. In addition to the foregoing, one or more embodiments can also be described in terms of flowcharts comprising acts for accomplishing a particular result, as shown in FIG. 8. The acts shown in FIG. 8 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 8. In some embodiments, a system can be configured to perform the acts of FIG. 8. Alternatively, the acts of FIG. 8 can be performed as part of a computer implemented method.

As mentioned above, FIG. 8 illustrates a flowchart of a series of acts 800 for training an NER model with noisy training data through a self-cleaning discriminator model in accordance with one or more implementations. While FIG. 8 illustrates acts according to one embodiment, alternative embodiments may omit, add to, reorder, and/or modify any of the acts shown in FIG. 8.

As shown in FIG. 8, the series of acts 800 include an act 802 of generating a predicted label (from a training sentence) utilizing a named entity recognition model. In some cases, the act 802 includes generating, utilizing a named entity recognition model, a predicted label from a first training sentence of a first set of training data. Furthermore, as shown in FIG. 8, the act 802 includes an act 804*a* of generating a predicted entity label. In some cases, the act 804*a* includes generating, utilizing the named entity recognition model, a predicted entity label from a first training sentence. In addition, the act 802 includes an act 804*b* of generating a predicted class label. For example, the act 804*b* includes generating, utilizing the named entity recognition model, a predicted class label from the first training sentence.

Furthermore, as shown in FIG. 8, the series of acts 800 include an act 806 of determining a discriminator weight for the predicted label (utilizing a discriminator model). For example, the act 806 includes determining, utilizing a discriminator model, a discriminator weight for the predicted label, wherein the discriminator model is trained on a second set of training data. Furthermore, as shown in FIG. 8, the act 806 includes an act 808*a* of determining a discriminator weight for a predicted entity label. In some cases, the act 808*a* includes generating, utilizing a discriminator model, a first discriminator weight for a predicted entity label (generated utilizing an NER model). Additionally, as shown in FIG. 8, the act 806 includes an act 808*b* of determining a discriminator weight for a predicted class label. Indeed, in some instances, the act 808*b* includes generating, utilizing a discriminator model, a second discriminator weight for a predicted class label (generated utilizing an NER model).

In addition, as shown in FIG. 8, the series of acts 800 include an act 810 of modifying parameters of the named entity recognition model based on the predicted label and the discriminator weight. In some cases, the act 810 includes generating a loss for the predicted label by comparing the predicted label to a ground truth label for the first training sentence. In addition, in one or more instances, the act 810 includes modifying parameters of the named entity recognition model utilizing the loss for the predicted label and the discriminator weight for the predicted label. In one or more embodiments, the act 810 includes generating a weighted loss for the predicted label based on the predicted label, a ground truth label for the training sentence, and the discriminator weight. In addition, in one or more instances, the act 810 includes modifying parameters of the named entity recognition model utilizing the weighted loss for the predicted label.

Additionally, in one or more implementations, the act 810 includes determining a first weighted measure of loss from a first discriminator weight (for a predicted entity label) and a second weighted measure of loss from a second discriminator weight (for a predicted class label). In addition, in one or more embodiments, the act 810 includes modifying parameters of the named entity recognition model based on the first weighted measure of loss and the second weighted measure of loss.

In some instances, the series of acts 800 include identifying the first set of training data by receiving a noisy training data set. In addition, in some cases, the series of acts 800 include identifying the second set of training data by receiving a guidance training data set, wherein the noisy training data set comprises a greater (or higher) error rate than the guidance training data set.

Furthermore, in one or more implementations, the series of acts 800 include generating, utilizing the named entity recognition model, an additional predicted label from a second training sentence of the first set of training data. Additionally, in some instances, the series of acts 800 include determining, utilizing the discriminator model, an additional discriminator weight for the additional predicted label. Moreover, in some cases, the series of acts 800 include modifying the parameters of the named entity recognition model based on an additional measure of loss based on the additional predicted label and the additional discriminator weight.

In some embodiments, the series of acts 800 include generating the predicted label by generating a predicted entity label or a predicted class label for a word within the first training sentence. In addition, in one or more instances, the series of acts 800 include determining, utilizing the discriminator model, the discriminator weight for the predicted label by determining an entity label discriminator weight for the predicted entity label and a class label discriminator weight for the predicted class label. Furthermore, in one or more implementations, the series of acts 800 include modifying the parameters of the named entity recognition model based on the entity label discriminator weight and the class label discriminator weight.

In some cases, the series of acts 800 include identifying a second training sentence from the second set of training data and identifying, for the second training sentence, a prompt sentence indicating an entity and a class for the entity described within the second training sentence. Moreover, in one or more implementations, the series of acts 800 include generating, utilizing the discriminator model, an authenticity prediction for the prompt sentence. In addition, in one or more cases, the series of acts 800 include modifying parameters of the discriminator model based on a comparison of the authenticity prediction and a ground truth authenticity prediction for the prompt sentence from the second set of training data.

Additionally, in some instances, the series of acts 800 include identifying a second training sentence from the second set of training data based on a comparison between the first training sentence and the second training sentence. Moreover, in some cases, the series of acts 800 include generating, utilizing the named entity recognition model, the predicted label for the first training sentence based on a demonstration from the second training sentence.

In some implementations, the series of acts 800 include adding the first training sentence and the corresponding predicted label to the second set of training data based on an accuracy metric for the predicted label and the discriminator weight for the predicted label. Moreover, in some instances, the series of acts 800 include modifying the parameters of the discriminator model based on an authenticity prediction by the discriminator model on the first training sentence and the corresponding predicted label. In addition, in one or more implementations, the series of acts 800 include determining the discriminator weight by determining, utilizing the discriminator model, an authenticity score of the predicted label indicating an authenticity of the predicted label in context of the first training sentence.

Additionally, in one or more cases, the series of acts 800 include generating an entity label loss for the predicted entity label by comparing the predicted entity label to a ground truth entity label for the first training sentence. Moreover, in some cases, the series of acts 800 include determining the first weighted measure of loss based on the entity label loss and the first discriminator weight. Furthermore, in some instances, the series of acts 800 include generating a class label loss for the predicted class label by comparing the predicted class label to a ground truth class label for the first training sentence. In addition, in some cases, the series of acts 800 include determining the second weighted measure of loss based on the class label loss and the second discriminator weight.

Furthermore, in one or more embodiments, the series of acts 800 include generating, utilizing the named entity recognition model, an additional predicted label from a second training sentence. Moreover, in one or more instances, the series of acts 800 include determining, utilizing the discriminator model, a third discriminator weight for the additional predicted label. In addition, in one or more cases, the series of acts 800 include modifying the parameters of the named entity recognition model based on a third measure of loss based on the additional predicted label and the third discriminator weight.

Additionally, in one or more instances, the series of acts 800 include generating, utilizing the discriminator model, the first discriminator weight for the predicted entity label by generating a prompt sentence for the predicted entity label indicating a word from the first training sentence as an entity and generating the first discriminator weight by generating, utilizing the discriminator model, an authenticity prediction score for the prompt sentence.

Furthermore, in one or more cases, the series of acts 800 include generating the predicted entity label to indicate a word from the first training sentence as an entity. In addition, in one or more instances, the series of acts 800 include generating the predicted class label to indicate a class for the word. For example, a class classifies the word as a place, a person, or an object.

Additionally, in some instances, the series of acts 800 include generating the weighted loss for the predicted label by generating a loss for the predicted label by comparing the predicted label to the ground truth label for the training sentence and generating the weighted loss based on a combination of the loss and the discriminator weight.

In some cases, the series of acts 800 include generating, utilizing the named entity recognition model, an additional predicted label from an additional training sentence. Moreover, in some instances, the series of acts 800 include determining, utilizing the discriminator model, an additional discriminator weight for the additional predicted label. Furthermore, in one or more implementations, the series of acts 800 include modifying the parameters of the named entity recognition model utilizing an additional weighted loss based on the additional predicted label, an additional ground truth label for the additional training sentence, and the additional discriminator weight.

In some instances, the series of acts 800 include generating the predicted label by generating a predicted entity label and a predicted class label for a word within the training sentence. Moreover, in one or more implementations, the series of acts 800 include determining, utilizing the discriminator model, the discriminator weight for the predicted label by determining an entity label discriminator weight for the predicted entity label and a class label discriminator weight for the predicted class label. Then, in some cases, the series of acts 800 include generating the weighted loss by generating an entity label weighted loss based on the predicted entity label, a ground truth entity label for the additional training sentence, and the entity label discriminator weight and/or generating a class label weighted loss based on the predicted class label, a ground truth class label for the additional training sentence, and the class label discriminator weight. Additionally, in some cases, the series of acts 800 include generating the predicted entity label to indicate a word from the training sentence as an entity and/or generating the predicted class label to indicate a class for the word.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
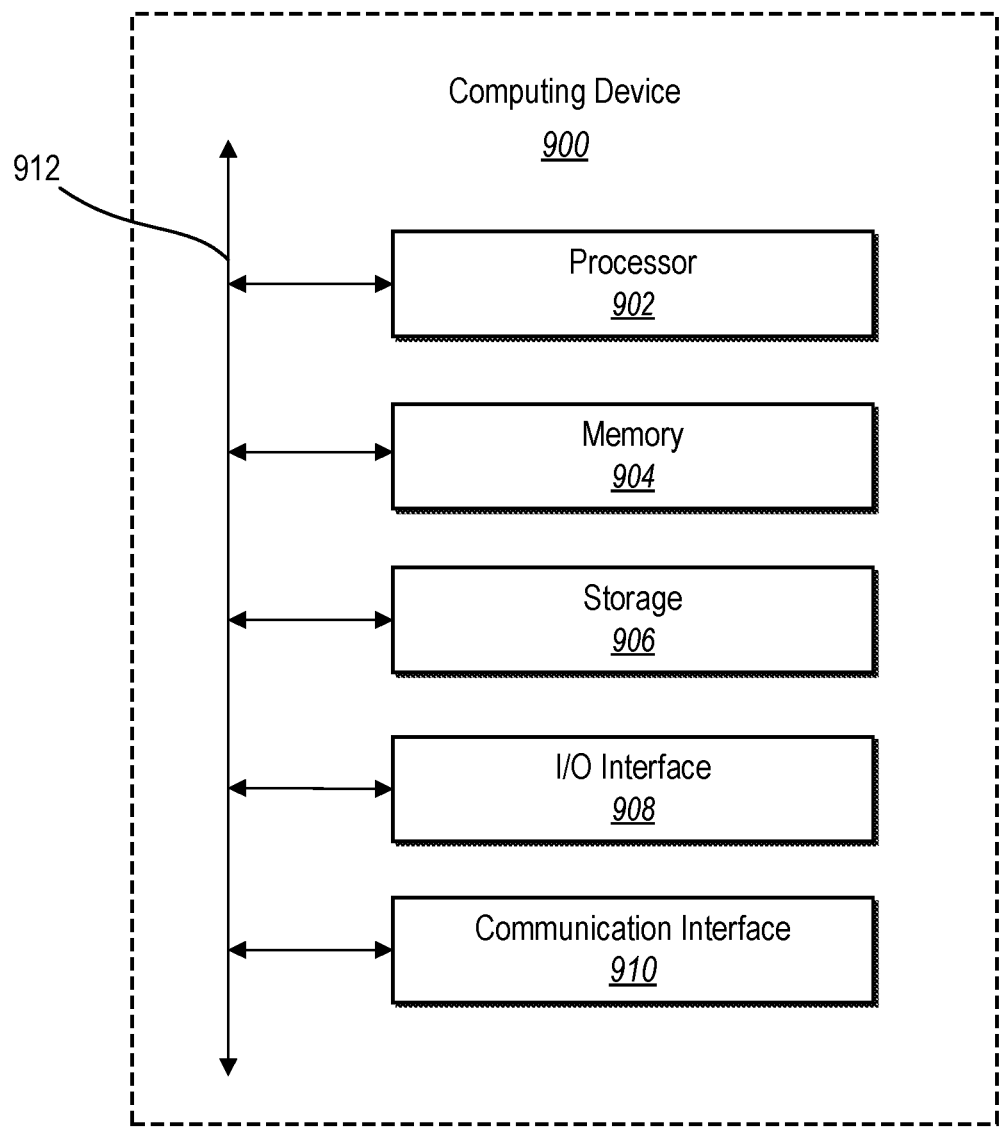
FIG. 9 illustrates a block diagram of an example computing device in accordance with one or more implementations.

FIG. 9 illustrates a block diagram of an example computing device 900 that may be configured to perform one or more of the processes described above. One will appreciate that one or more computing devices, such as the computing device 900 may represent the computing devices described above (e.g., the server device(s) 102, the client device 110, and/or the administrator device 116). In one or more implementations, the computing device 900 may be a mobile device (e.g., a mobile telephone, a smartphone, a PDA, a tablet, a laptop, a camera, a tracker, a watch, a wearable device, etc.). In some implementations, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other implementations. Furthermore, in certain implementations, the computing device 900 includes fewer components than those shown in FIG. 9. Components of the computing device 900 shown in FIG. 9 will now be described in additional detail.

In particular implementations, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can include hardware, software, or both that connects components of the computing device 900 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
   generating, utilizing a named entity recognition model, a predicted label from a first training sentence of a first set of training data, wherein the first set of training data comprises a noisy training data set;
   generating a loss for the predicted label by comparing the predicted label to a ground truth label for the first training sentence;
   determining, utilizing a discriminator model, a discriminator weight for the predicted label, wherein the discriminator model is trained on a second set of training data, wherein:
   the second set of training data comprises a guidance training data set, and
   the noisy training data set comprises a greater error rate than the guidance training data set; and
   modifying parameters of the named entity recognition model utilizing the loss for the predicted label and the discriminator weight for the predicted label.

2. The non-transitory computer-readable medium of claim 1, wherein generating, utilizing the named entity recognition model, the predicted label from the first training sentence comprises generating an entity label or a class label.

3. The non-transitory computer-readable medium of claim 1, wherein the operations further comprise:
   generating, utilizing the named entity recognition model, an additional predicted label from a second training sentence of the first set of training data;

determining, utilizing the discriminator model, an additional discriminator weight for the additional predicted label; and modifying the parameters of the named entity recognition model based on an additional measure of loss based on the additional predicted label and the additional discriminator weight.

4. The non-transitory computer-readable medium of claim 1, wherein the operations further comprise generating the predicted label by generating a predicted entity label or a predicted class label for a word within the first training sentence.

5. The non-transitory computer-readable medium of claim 4, wherein the operations further comprise:
determining, utilizing the discriminator model, the discriminator weight for the predicted label by determining an entity label discriminator weight for the predicted entity label and a class label discriminator weight for the predicted class label; and
modifying the parameters of the named entity recognition model based on the entity label discriminator weight and the class label discriminator weight.

6. The non-transitory computer-readable medium of claim 1, wherein the operations further comprise:
identifying a second training sentence from the second set of training data;
identifying, for the second training sentence, a prompt sentence indicating an entity and a class for the entity described within the second training sentence;
generating, utilizing the discriminator model, an authenticity prediction for the prompt sentence; and
modifying parameters of the discriminator model based on a comparison of the authenticity prediction and a ground truth authenticity prediction for the prompt sentence from the second set of training data.

7. The non-transitory computer-readable medium of claim 1, wherein the operations further comprise:
identifying a second training sentence from the second set of training data based on a comparison between the first training sentence and the second training sentence; and
generating, utilizing the named entity recognition model, the predicted label for the first training sentence based on a demonstration from the second training sentence.

8. The non-transitory computer-readable medium of claim 1, wherein the operations further comprise adding the first training sentence and the corresponding predicted label to the second set of training data based on an accuracy metric for the predicted label and the discriminator weight for the predicted label.

9. The non-transitory computer-readable medium of claim 8, wherein the operations further comprise modifying the parameters of the discriminator model based on an authenticity prediction by the discriminator model on the first training sentence and the corresponding predicted label.

10. The non-transitory computer-readable medium of claim 1, wherein the operations further comprise determining the discriminator weight by determining, utilizing the discriminator model, an authenticity score of the predicted label indicating an authenticity of the predicted label in context of the first training sentence.

11. A system comprising:
a memory component comprising a named entity recognition model and a discriminator model; and
a processing device coupled to the memory component, the processing device to perform operations comprising:

generating, utilizing the named entity recognition model, a predicted entity label from a first training sentence and a predicted class label from the first training sentence, wherein the first training sentence is from a noisy training data set;
generating, utilizing a discriminator model, a first discriminator weight for the predicted entity label and a second discriminator weight for the predicted class label, wherein:
the discriminator model is trained on a guidance training data set, and the noisy training data set comprises a greater error rate than the guidance training data set;
determining a first weighted measure of loss from the first discriminator weight and a second weighted measure of loss from the second discriminator weight; and
modifying parameters of the named entity recognition model based on the first weighted measure of loss and the second weighted measure of loss.

12. The system of claim 11, wherein the operations further comprise:
generating an entity label loss for the predicted entity label by comparing the predicted entity label to a ground truth entity label for the first training sentence;
determining the first weighted measure of loss based on the entity label loss and the first discriminator weight;
generating a class label loss for the predicted class label by comparing the predicted class label to a ground truth class label for the first training sentence; and
determining the second weighted measure of loss based on the class label loss and the second discriminator weight.

13. The system of claim 11, wherein the operations further comprise:
generating, utilizing the named entity recognition model, an additional predicted label from a second training sentence;
determining, utilizing the discriminator model, a third discriminator weight for the additional predicted label; and
modifying the parameters of the named entity recognition model based on a third measure of loss based on the additional predicted label and the third discriminator weight.

14. The system of claim 11, wherein the operations further comprise generating, utilizing the discriminator model, the first discriminator weight for the predicted entity label by:
generating a prompt sentence for the predicted entity label indicating a word from the first training sentence as an entity; and
generating the first discriminator weight by generating, utilizing the discriminator model, an authenticity prediction score for the prompt sentence.

15. The system of claim 11, wherein the operations further comprise:
generating the predicted entity label to indicate a word from the first training sentence as an entity; and
generating the predicted class label to indicate a class for the word, wherein the class classifies the word as a place, a person, or an object.

16. A computer-implemented method comprising:
generating, utilizing a named entity recognition model, a predicted label from a training sentence, wherein the training sentence is from a noisy training data set;
determining, utilizing a discriminator model, a discriminator weight for the predicted label wherein:
the discriminator model is trained on a guidance training data set, and the noisy training data set comprises a greater error rate than the guidance training data set;

generating a weighted loss for the predicted label based on the predicted label, a ground truth label for the training sentence, and the discriminator weight; and modifying parameters of the named entity recognition model utilizing the weighted loss for the predicted label.

17. The computer-implemented method of claim 16, further comprising generating the weighted loss for the predicted label by:

generating a loss for the predicted label by comparing the predicted label to the ground truth label for the training sentence; and generating the weighted loss based on a combination of the loss and the discriminator weight.

18. The computer-implemented method of claim 16, further comprising:

generating, utilizing the named entity recognition model, an additional predicted label from an additional training sentence;

determining, utilizing the discriminator model, an additional discriminator weight for the additional predicted label; and modifying the parameters of the named entity recognition model utilizing an additional weighted loss based on the additional predicted label, an additional ground truth label for the additional training sentence, and the additional discriminator weight.

19. The computer-implemented method of claim 16, further comprising:

generating the predicted label by generating a predicted entity label and a predicted class label for a word within the training sentence;

determining, utilizing the discriminator model, the discriminator weight for the predicted label by determining an entity label discriminator weight for the predicted entity label and a class label discriminator weight for the predicted class label; and generating the weighted loss by:

generating an entity label weighted loss based on the predicted entity label, a ground truth entity label for the training sentence, and the entity label discriminator weight; and generating a class label weighted loss based on the predicted class label, a ground truth class label for the training sentence, and the class label discriminator weight.

20. The computer-implemented method of claim 19, further comprising:

generating the predicted entity label to indicate a word from the training sentence as an entity; and generating the predicted class label to indicate a class for the word.

* * * * *